United States Patent [19]
Lee et al.

[11] Patent Number: 6,128,061
[45] Date of Patent: Oct. 3, 2000

[54] LIQUID CRYSTAL DISPLAY DEVICE

[75] Inventors: Seung Hee Lee, Ich'on; In Cheol Park, Seoul; Hyang Yul Kim; Seong Jun An, both of Ich'on; Bong Gyu Rho, Suwon; Wan Yong Choi, Ich'on; Joon Heon Kim, Seoul, all of Rep. of Korea

[73] Assignee: Hyundai Electronics Industries Co., Ltd., Kyoungki-do, Rep. of Korea

[21] Appl. No.: 09/207,872

[22] Filed: Dec. 8, 1998

[30] Foreign Application Priority Data

Dec. 8, 1997 [KR] Rep. of Korea ................. 97-66700
Dec. 17, 1997 [KR] Rep. of Korea ................. 97-70130
Jan. 30, 1998 [KR] Rep. of Korea ................. 98-2493

[51] Int. Cl.[7] .................................................. G02F 1/1343
[52] U.S. Cl. ........................................ 349/141; 349/143
[58] Field of Search .......................... 349/42, 43, 141, 349/143, 144

[56] References Cited

U.S. PATENT DOCUMENTS

| | | | |
|---|---|---|---|
| 5,734,451 | 3/1998 | Yanagawa et al. | 349/43 |
| 5,745,207 | 4/1998 | Asada et al. | 349/141 |
| 5,905,556 | 5/1999 | Suzuki et al. | 349/141 |
| 5,907,379 | 5/1999 | Kim et al. | 349/141 |
| 5,995,182 | 11/1999 | Watanabe et al. | 349/110 |
| 6,028,653 | 2/2000 | Nishida | 349/141 |
| 6,052,168 | 4/2000 | Nishida et al. | 349/141 |

FOREIGN PATENT DOCUMENTS 06289398 10/1994 Japan ................. G02F 1/1337

*Primary Examiner*—James A. Dudek
*Attorney, Agent, or Firm*—Ladas & Parry

[57] ABSTRACT

A liquid crystal display preventing color shift is provided. The liquid crystal display comprises: a liquid crystal layer having a plurality of liquid crystal molecules; a lower substrate disposed at one side of the liquid crystal layer and having a sub pixel defined by crossing a gate bus line and a data bus line at an interface with said liquid crystal layer and further having a counter electrode and a pixel electrode for driving the liquid crystal molecules within each sub pixel; and an upper substrate disposed at the other side of the liquid crystal layer and having a color filter, wherein an electric field parallel to the surface of the substrate and the gate bus line and an electric field parallel to the data bus line are simultaneously formed when a voltage is applied to the counter electrode and the pixel electrode.

49 Claims, 21 Drawing Sheets

LIQUID CRYSTAL DISPLAY DEVICE

FIELD OF THE INVENTION

This invention generally relates to a liquid crystal display device, more particularly to a liquid crystal display device having liquid crystal driving electrodes on a lower insulating substrate and the liquid crystal driving electrodes are also capable of preventing the color shift.

BACKGROUND OF THE INVENTION

A liquid crystal display device has been used in various information display terminals such as view finders for video camera, a display of a compact television set and a spatial light modulator of a high-resolution projection television set and the like.

The major operating system for the liquid crystal display device is the twisted nematic ("TN") and the super twisted nematic ("STN"). Though they are presently commercially used in the market, the characteristics of narrow viewing angle are still remained unsolved.

An In-Plane Switching ("IPS") mode liquid crystal display has been suggested to solve foregoing problem.

As described in FIG. 1, a plurality of gate bus lines 11 are formed on a lower insulating substrate 10 along an x direction shown in the drawings and the gate bus lines 11 are parallel to each other. A plurality of data bus lines 15 are formed along an y direction which is substantively perpendicular to the x direction. Therefore a sub pixel region is defined. At this time, a pair of gate bus line 11 and a pair of data bus line 15 are formed for defining the sub pixel region. The gate bus line 11 and the data bus line 15 are insulated by a gate insulating layer (not shown).

A counter electrode 12 is formed, for example in a rectangular frame shape, within a sub pixel region and it is disposed at the same plane with the gate bus line 11.

A pixel electrode 14 is formed at each sub pixel region where the counter electrode 12 is formed. The pixel electrode 14 is composed of a web region 14a which divides the region surrounded by the rectangular frame type counter electrode 12 with a y direction, a first flange region 14b connected to a portion of the web region 14a and simultaneously overlapped with the counter electrode 12 of the x direction, and a second flange region 14c which is parallel to the first flange region 14c and is connected to the other portion of the web region 14a. That is to say, the pixel electrode 14 seems the letter "I". Here, the pixel electrode 14 and the counter electrode 12 are insulated from each other by a gate insulating layer (not shown).

A thin film transistor 16 (hereinafter "TFT") is disposed at the intersection of the gate bus line 11 and the data bus line 12. This TFT 16 is composed of a gate electrode being extended from the gate bus line 11, a drain electrode being extended from the data bus line 15, a source electrode being extended from the pixel electrode 14 and a channel layer 17 formed on upper of the gate electrode.

A storage capacitor (Cst) is disposed at the region where the counter electrode 12 and the pixel electrode 14 are overlapped.

Though not shown in FIG. 1, an upper substrate(not shown) equipped with a color filter (not shown) and a lower substrate 10 are oppositely disposed with predetermined distance. Further a liquid crystal layer (not shown) having a plurality of liquid crystal molecules (hereinafter "LC molecules") is interposed between the upper substrate (not shown) and the lower substrate 10.

Also, onto the resultant structure of the lower substrate and onto an inner surface of the upper substrate are formed homogeneous alignment layers respectively. By the homogeneous alignment layer, before forming an electric field between the counter electrode 12 and the pixel electrode 14, long axes of LC molecules 19 are arranged parallel to the surface of the substrate 10. Also, by the rubbing axis of the homogeneous alignment layer, the orientation direction of the molecules 19 is decided. The R direction in the drawings is the direction of rubbing axis for the homogeneous alignment layer formed on the lower substrate 10.

A first polarizing plate(not shown) is formed on the outer surface of the lower substrate 10 and a second polarizing plate (not shown) is formed on the outer surface of the upper substrate (not shown). Here the first polarizing plate is disposed to make its polarizing axis to be parallel to the P direction of the FIG. 1. That means, the rubbing axis direction R and the polarizing axis direction P are parallel each other. On the other hand, the second polarizing plate is disposed to make its polarizing axis to be parallel to the Q direction which is substantially perpendicular to the polarizing axis of the first polarizing plate.

When a scanning signal is applied to the gate bus line 11 and a display signal is applied to the data bus line 15, the TFT 16 disposed at the intersection of the gate bus line 11 and the data bus line 15 is turned on. Then the display signal of the data bus line 15 is transmitted to the pixel electrode 14 through the TFT 16. Consequently, an electric field E is generated between the counter electrode 12 where a common signal is inputted and the pixel electrode 14. At this time, as the direction of electric field E is referenced as x direction as described in the FIG. 1, it has a predetermined degree of angle with the rubbing axis.

Afterwards, before the electric field is not generated, the long axes of the LC molecules are arranged parallel to the substrate surface and parallel to rubbing direction R. Therefore the light passed through the first polarizing plate and the liquid crystal layer is unable to pass the second polarizing plate, the screen has dark state.

As the electric field is generated, the long axes(or optical axes) are rearranged parallel to the electric field, and therefore the incident light passed through the first polarizing plate and the liquid crystal layer passes the second polarizing plate and the screen has white state.

At that time, the direction of the long axes of the LC molecules as being parallel to the substrate surface becomes changed according to the presence of the electric field.

As well known, the refractive anisotropy (or birefringence, Δn) is occurred due to the difference of the lengths of the long and the short axes. The refractive anisotropy Δn is also varied from the observer's viewing directions. Therefore a predetermined color is appeared on the region where the polar angle is of 0 degree and the azimuth angle range of degrees 0, 90, 180 and 270 in spite of the white state. This regards as color shift and more detailed description thereof is attached with reference to the equation 1.

$$T \approx T_0 \sin^2(2\chi) \cdot \sin^2(\pi \cdot \Delta n d/\lambda) \qquad \text{equation 1}$$

wherein, T: transmittance;

$T_0$: transmittance to the reference light;

$\chi$: angle between an optical axis of liquid crystal molecule and a polarizing axis of the polarizing plate;

$\Delta n$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta nd/\lambda$ should be $\pi/2$ according to the equation 1. As the $\Delta nd$ varies with the birefringence difference of the LC molecules from viewing directions, the $\lambda$ value is varied in order to make $\Delta nd/\lambda$ to be $\pi/2$. According to this condition, the color corresponding to the varied wavelength $\lambda$ appears.

Accordingly, as the value of An relatively decreases at the viewing directions "a" and "c" toward the short axes of the LC molecules, the wavelength of the incident light for obtaining the maximum transmittance relatively decreases. Consequently a blue color having shorter wavelength than a white color is emerged.

On the other hand, as the value of An relatively increases at the viewing directions "b" and "d" toward the short axes of the LC molecules, the wavelength of incident light relatively increases. Consequently a yellow color having a longer wavelength than the white color is emerged. This causes deterioration to the resolution of IPS-LCDs.

SUMMARY OF THE INVENTION

It is an object of the present invention to provide an LCD device preventing color shift and improving the picture quality.

So as to accomplish the above object, the LCD device according to one embodiment of the present invention comprises:

a substrate;

a counter electrode formed on the substrate and including a rectangular frame type main electrode and at least one dividing electrode to divide a space surrounded by the main electrode into a plurality of spaces;

a pixel electrode formed on the substrate and including a first electrode traversing some portions of the counter electrode spaces with a first direction and a second electrode which is electrically connected to the first electrode and traversing the rest of the counter electrode spaces with a second direction perpendicular to the first direction; and an insulating layer which insulates the counter electrode and the pixel electrode from each other.

The LCD device according to another embodiment of the present invention comprises:

a liquid crystal layer having a plurality of liquid crystal molecules;

a lower substrate disposed at one side of the liquid crystal layer and having a sub pixel defined by crossing a gate bus line and a data bus line at an interface with said liquid crystal layer, a thin film transistor at each intersection of the gate bus line and the data bus line and a counter and a pixel electrodes for driving the liquid crystal molecules within each sub pixel;

an upper substrate disposed at the other side of the liquid crystal layer and having a color filter;

a first and a second homogeneous alignment layers having rubbing axis of a predetermined direction and interposed between the liquid crystal layer and the lower substrate, and between the liquid crystal layer and the upper substrate; and a first and a second polarizing plates disposed in the outer surfaces of the lower substrate and the upper substrate respectively;

wherein the counter electrode includes a rectangular fame type main electrode and a dividing electrode to divide a space surrounded by the rectangular frame type main electrode into a plurality of spaces;

wherein the pixel electrode includes a first electrode traversing some spaces of the counter electrode spaces with a direction parallel to the gate bus line and a second electrode which is electrically connected to the first electrode and traversing the rest of the counter electrode spaces with a direction parallel to the data bus line; and wherein an electric field parallel to the surface of the substrate and the gate bus line and an electric field parallel to the surface of the substrate and the data bus line are simultaneously formed when a voltage is applied to the counter electrode and the pixel electrode.

The LCD device according to further embodiment of the present invention comprises:

a liquid crystal display layer having a plurality of LC molecules;

a lower substrate disposed at one side of the liquid crystal layer and having a sub pixel defined by crossing a gate bus line and a data bus line at an interface with said liquid crystal layer and a thin film transistor at each intersection of a counter electrode and a pixel electrode, wherein the counter electrode and the pixel electrode are provided for driving the LC molecules within each sub pixel;

an upper substrate disposed at the other side of the liquid crystal layer and having a color filter;

a first and a second homogeneous alignment layers having predetermined direction of rubbing axes and interposed between the liquid crystal layer and the lower substrate, and between the liquid crystal layer and the upper substrate;

a first and a second polarizing plates disposed in the outer surfaces of the lower substrate and the upper substrate respectively; and a phase compensating plate sandwiched between the upper substrate and the second polarizing plate;

wherein the counter electrode includes a rectangular fame type main electrode and a dividing electrode to divide an area surrounded by the rectangular frame type main electrode into a plurality of spaces;

wherein the pixel electrode includes a first electrode traversing some spaces of the counter electrode spaces with a direction parallel to the gate bus line and a second electrode which is electrically connected to the first electrode and traversing the rest of the counter electrode spaces with a direction parallel to the data bus line; and wherein an electric field parallel to the substrate surface and the gate bus line and another electric field parallel to the data bus line are simultaneously formed when a voltage is applied to the counter electrode and the pixel electrode.

The LCD device according to still another embodiment of the present invention comprises:

a liquid crystal display layer having a plurality of liquid crystal molecules;

a lower substrate disposed at one side of the liquid crystal layer and having a sub pixel defined by crossing a gate bus line and a data bus line at an interface with said liquid crystal layer and having a thin film transistor at each intersection of the gate bus line and the data bus line, and a counter and a pixel electrodes for driving the liquid crystal molecules within each sub pixel;

an upper substrate disposed at the other side of the liquid crystal layer and having a color filter;

a first and a second homeotropic alignment layers interposed between the liquid crystal layer and the lower substrate, and between the liquid crystal layer and the upper substrate;

a first and a second polarizing plates disposed in the outer surfaces of the lower substrate and the upper substrate respectively; and a phase compensating plate sandwiched between the upper substrate and the second polarizing plate;

wherein the counter electrode includes a rectangular fame type main electrode and a dividing electrode to divide a space surrounded by the rectangular frame type main electrode into a plurality of spaces;

wherein the pixel electrode includes a first electrode traversing some spaces of the counter electrode spaces with a direction parallel to the gate bus line and a second electrode which is electrically connected to the first electrode and traversing the rest of the counter electrode spaces with a direction parallel to the data bus line; and wherein an electric field parallel to the surface of the substrate and the gate bus line and an electric field parallel to the data bus line are simultaneously formed when a voltage is applied to the counter electrode and the pixel electrode.

The LCD device according to even another embodiment of the present invention comprises:

a liquid crystal display layer having a plurality of liquid crystal molecules;

a lower substrate disposed at one side of the liquid crystal layer and having a sub pixel defined by crossing a gate bus line and a data bus line at an interface with said liquid crystal layer and having a thin film transistor at each intersection of the gate bus line and the data bus line, and a counter and a pixel electrodes for driving the liquid crystal molecules within each sub pixel;

an upper substrate disposed at the other side of the liquid crystal layer and having a color filter;

a first and a second alignment layers having predetermined direction of rubbing axis and interposed between the liquid crystal layer and the lower substrate, and between the liquid crystal layer and the upper substrate; and a first and a second polarizing plates disposed at the outer surfaces of the lower substrate and the upper substrate respectively;

wherein the counter electrode includes a rectangular frame type main electrode and a dividing electrode to divide a space surrounded by the rectangular frame type main electrode into a plurality of spaces;

wherein the pixel electrode includes a first branch traversing some spaces of the counter electrode spaces with a direction parallel to the gate bus line, a second branch which is electrically connected to the first electrode and traversing the rest of the counter electrode spaces with a direction parallel to the data bus line, a third branch which is electrically connected to the first electrode and crossed to one portion of the first branch, said third branch of the pixel electrode parallel to the data bus line is disposed in the center portion of sub pixel; and wherein an electric field parallel to the surface of the substrate and the gate bus line and an electric field parallel to the data bus line are simultaneously formed when a voltage is applied to the counter electrode and the pixel electrode.

BRIEF DESCRIPTION OF THE INVENTION

FIG. 6 illustrates an arrangement of the LC molecules according to the second embodiment of the present invention when the LCD is turned on.

FIG. 9A and FIG. 9B illustrate an arrangement of LC molecules according to the third embodiment of the present invention when an LCD is turned on.

DETAILED DESCRIPTION OF THE PREFERRED EMBODIMENT

Hereinafter preferred embodiments of the present invention will be described in detail with reference to the attached drawings.

First Embodiment

Counter and Pixel Electrodes Structure Having Electric Fields of Two Directions

Figure 1:
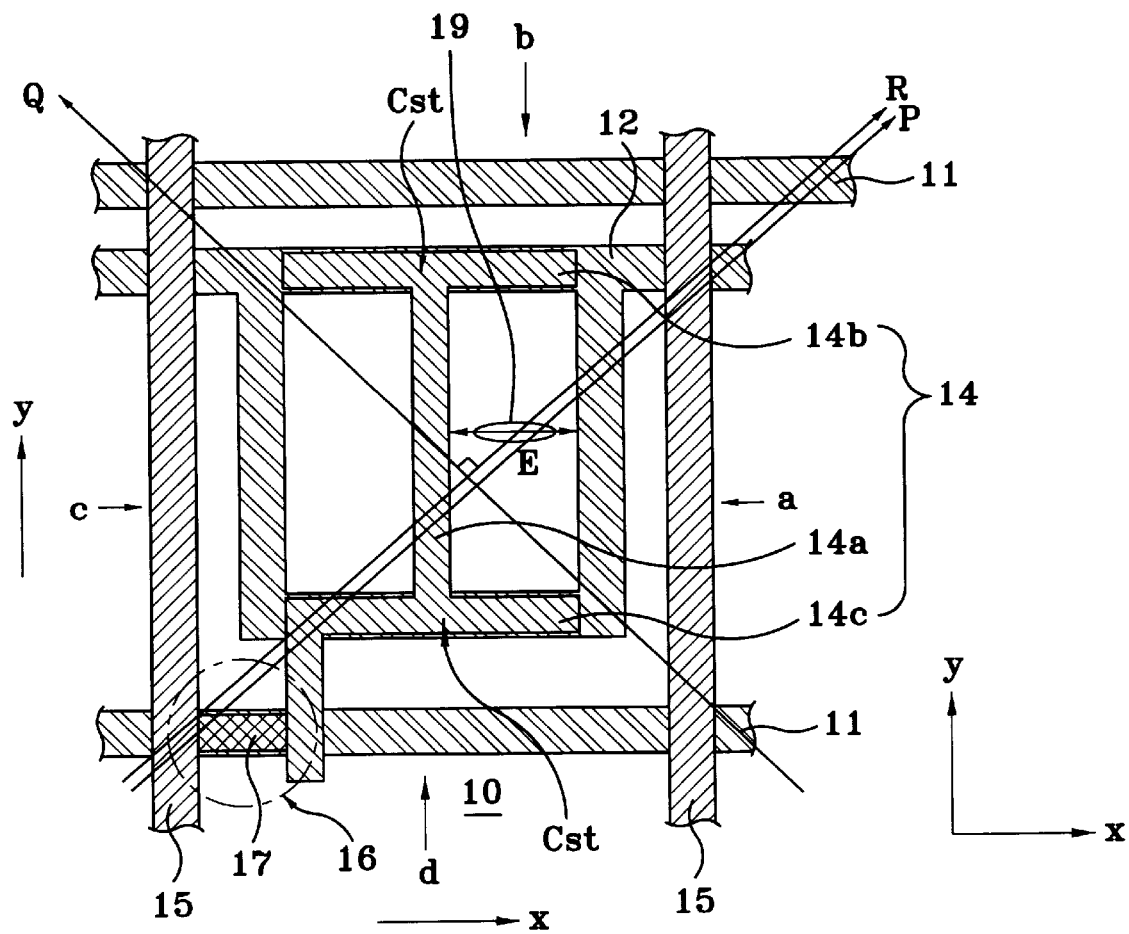
FIG. 1 is a plane view for showing a lower substrate of conventional IPS-LCDs.
Figure 2A:
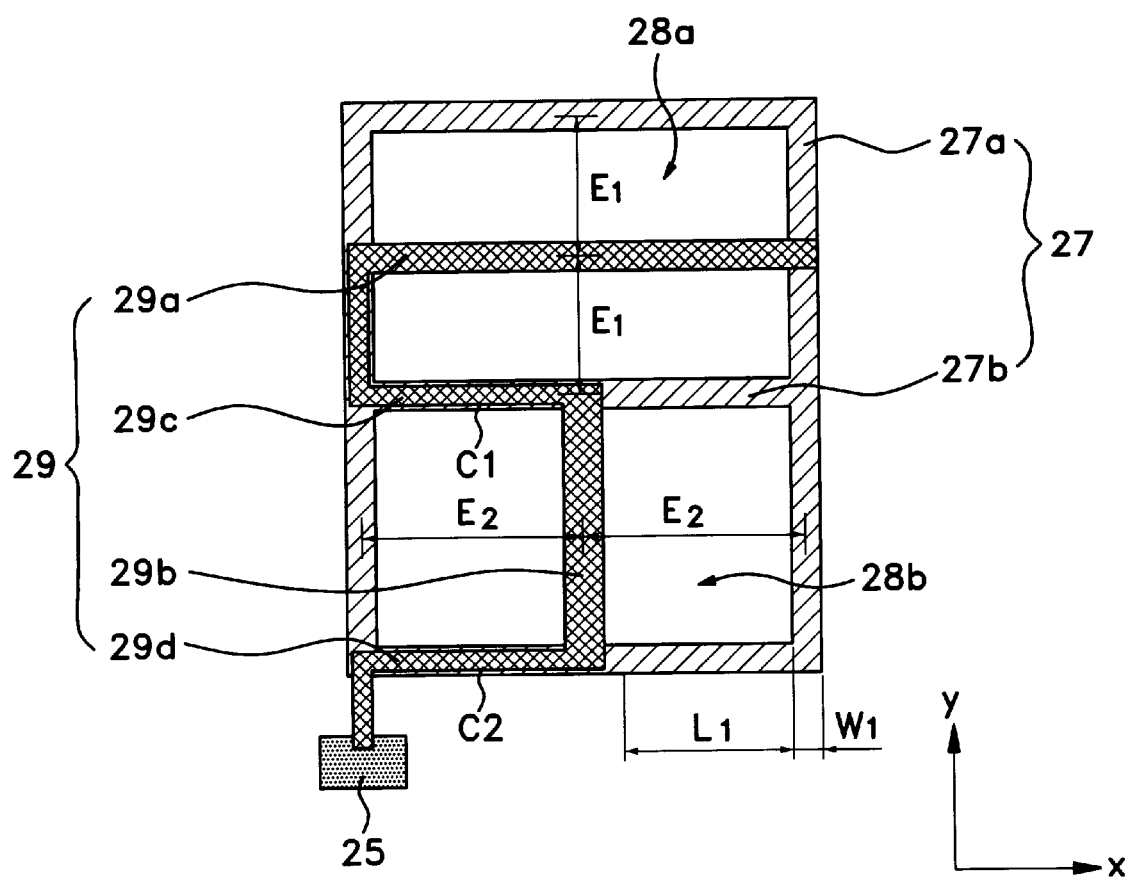
FIG. 2A and FIG. 2B are plane views of a counter electrode and a pixel electrode according to a first embodiment of the present invention.
Figure 2B:
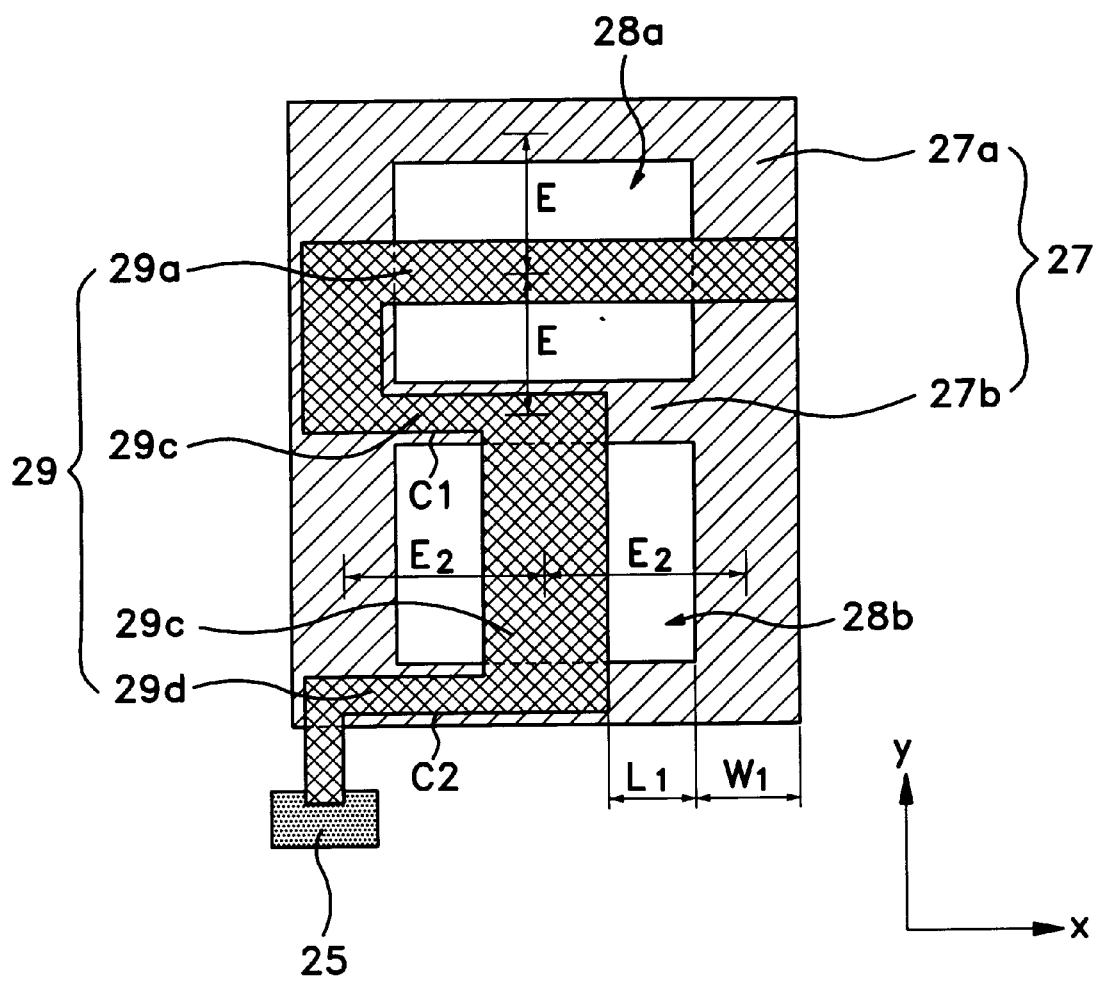

Referring to FIG. 2A, a counter electrode 27 and a pixel electrode 29 for driving the LC molecules are formed on the same substrate.

The counter electrode 27 includes a rectangular frame type main electrode 27a and a bar electrode 27b extended toward the x direction for dividing a space surrounded by the main electrode 27a in two. The space surrounded by the main electrode 27a is divided by the bar electrode 27b thereby defining a first space 28a and a second space 28b. Also, a reference signal is applied to the counter electrode 27.

The pixel electrode 29 is disposed to be overlapped with some portion of the counter electrode 27. The pixel electrode 29 includes a first electrode 29a of x direction dividing the first space 28a, a second electrode 29b of y direction dividing the second space 28b, a third electrode 29c connecting one portion of the first electrode 29a and the second electrode 29b and simultaneously overlapping a predetermined portion of the main electrode 27a of the counter electrode 27 and a predetermined portion of the bar electrode 27b, and a fourth electrode 29d connecting the other portion of the second electrode 29b and a display signal inputting part 25 and simultaneously overlapping a predetermined portion of the main electrode 27a.

Wherein, an insulating layer(not shown) is sandwiched between the counter electrode 27 and the pixel electrode 29 and those electrodes are insulated from each other.

Also, the storage capacitors C1 and C2 are formed at a region where the counter electrode 27 and the pixel electrode 29 are overlapped.

At that time, the widths of the main electrode 27a of the counter electrode 27 and the bar electrode 27b are almost the same and the widths are referred as W1. Also, the widths of the first electrode 29a of the pixel electrode 29 and the second electrode 29b, and those of the main electrode 27a and the bar electrode 27b of the counter electrode 27 are almost the same. However, each width of the third electrode 29c and the fourth electrode 29d is determinated within the range capable of ensuring the appropriate storage capacitance. A distance of the counter electrode 27 and the pixel electrode 29 is referenced as L1 and the L1 of the first space 28a and of the second space 28b is almost same.

In this embodiment, a positive dielectric anisotropy material is used for LC layer (not shown). Then the electrodes 27 and 29 are formed to make the L1 to be larger than the W1 since the LC molecules are driven in the L1 region.

Meanwhile, in case LC molecules having a negative dielectric anisotropy are used, LC molecules are driven such that their short axes are parallel to electric field. Accordingly as shown in FIG. 3B, the W1 of those electrodes 27 and 29 is larger than L1 or equal. Also, in case the LC molecules are of a negative dielectric anisotropy, the electrodes 27 and 29 should be made of transparent metal such as ITO (indium tin oxide) since the electrodes 27 and 29 are the light transmitting regions.

An electric field E1 of the y direction is formed in the first space 28a such as between the main electrode 27a of the x direction and the first electrode 29a of the pixel electrode 29, between the first electrode 29a of the pixel electrode 29 and the bar electrode 27b of the counter electrode 27 when a voltage difference is generated between the counter electrode 27 and the pixel electrode 29. On the other hand, an electric field E2 of the x direction is formed in the second space 28b between the main electrode 27a of the y direction and the second electrode 29b of the pixel electrode 29. Accordingly, the electric field of the x direction and the electric field of the y direction are simultaneously formed within a sub pixel P. Two domains, one lying along the x direction and the other lying along the y direction, are formed within a sub pixel in accordance with the arrangement of the LC molecules corresponding to the direction of the electric field. At this time, the intensities of those electric fields E1 and E2 are substantively equal. Also, the counter electrode 27 and the pixel electrode 29 can be modified as shown in FIG. 13A and FIG. 16B so as to form the x and the y directions of electric fields within a sub pixel simultaneously.

Modification-1

Figure 13A:
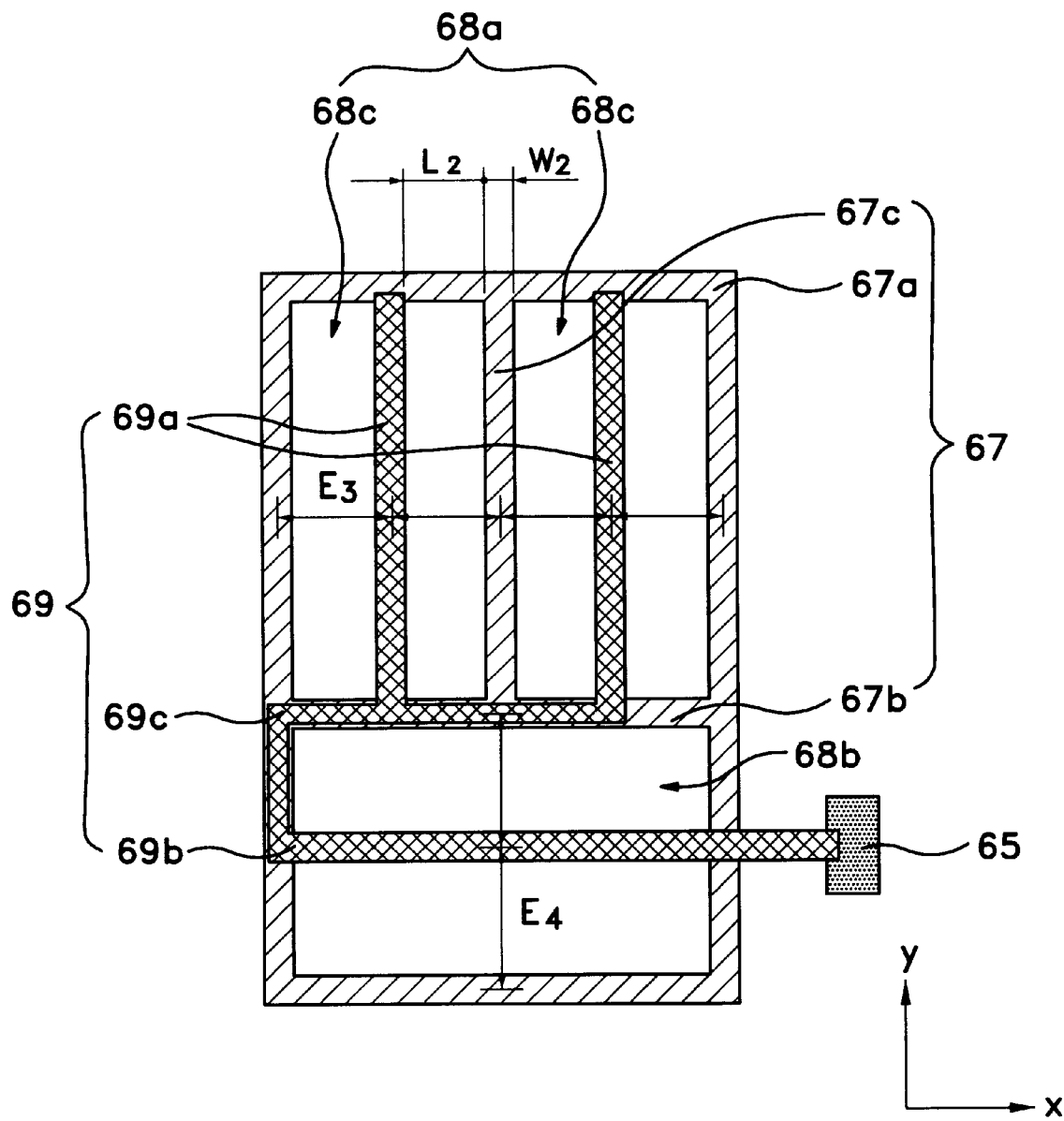
FIG. 13A and FIG. 13B are plane views for showing a structure of a counter electrode and a pixel electrode of a first modification example according to the first embodiment of the present invention.

First of all, as shown in FIG. 13A, a counter electrode 67 includes a main electrode 67a of rectangular frame type and a first bar electrode 67b extended to the x direction which divides a space surrounded by the main electrode 67a. The space surrounded by the main electrode 67a is divided in two, a first space 68a and a second space 68b by the first bar electrode 67b. The counter electrode 67 further includes a second bar electrode 67c extended to the y direction which divides the first space 68a. The first space 68a is divided third spaces 68c in two by the second bar electrode 67c.

A pixel electrode 69 includes first electrodes 69a extended to the y direction which divides the third spaces 68c in two respectively and a second electrode 69b extended to the x direction which divides the second space 68b in two; and a third electrode 69c connecting one portion of the first electrode 69a and the second electrode 69b and simultaneously overlapping a predetermined portion of the first bar electrode 67b of the counter electrode 67 and a predetermined portion of main electrode 67a. Here, the second electrode 69b is extended to a selected direction and is connected to a display signal inputting part 65. The display signal inputting part 65 is allowed to connect with any portion of the pixel electrode 69.

Also, a storage capacitor Cst is formed at a region where the counter electrode 67 and the pixel electrode 69 are overlapped.

At that time, the widths of the main electrode 67a of the counter electrode 67, the first bar electrode 67b and the second bar electrode 67c are almost the same and the widths are referred as W2. A distance of a counter electrode 67 and the pixel electrode 69 is referenced as L2 and the L2s of the second space 68b and of the third space 68c are almost the same. Also, the widths of the first electrode 69a of the pixel electrode 69 and the second electrode 69b, and those of the counter electrode 67 are almost the same. However, the width of the third electrode 69c of the pixel electrode 69 is determinated within the range capable of ensuring the appropriate storage capacitance.

Figure 13B:
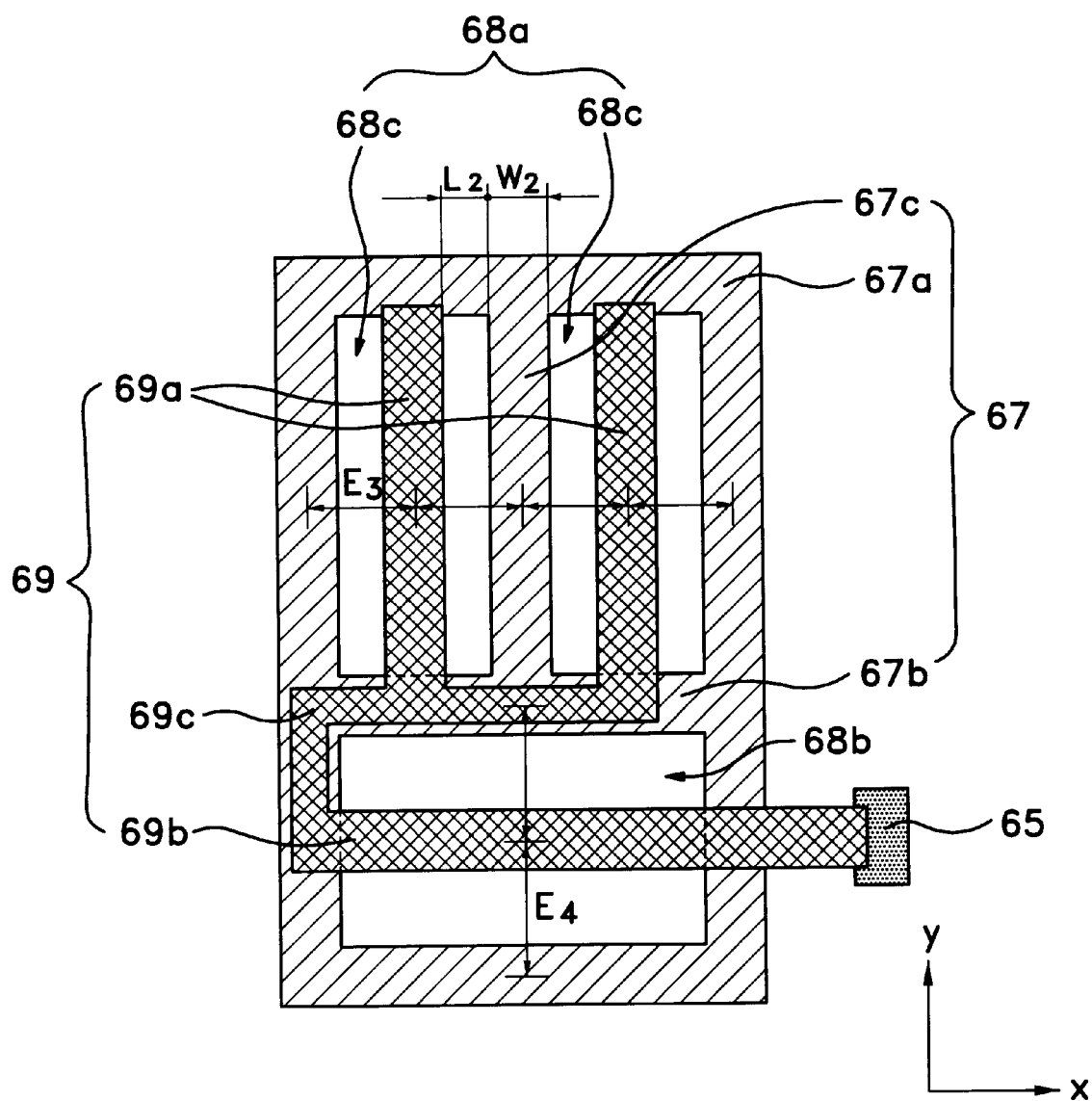

As described above, the values of W2 and L2 can be selected by considering the dielectric anisotropy of the LC molecules. The LC molecules of a positive dielectric anisotropy are used in FIG. 13A in which the L2 is larger than the W2. Otherwise, the LC molecules of a negative dielectric anisotropy are used in FIG. 13B in which the W2 is larger than the L2 and the counter electrode 67 and the pixel electrode 69 should be made of transparent metal since most of the LC molecules are driven in the upper of those electrodes as described above.

An electric field E3 of the x direction is formed in each third space 68c and an electric field E4 of the y direction is formed in the second space 68b when a voltage difference is generated between the counter electrode 67 and the pixel electrode 69. Two directions of electric fields being symmetrized each other are simultaneously formed within the sub pixel.

The electric field E3 of the x direction is formed in four regions and the electric field E4 is formed in two regions.

Here, since the intensity of transmittance is in proportion to the intensity of electric field product squared, the ratio of the E3 to the E4 is preferably ½ or 0.2~0.8 for taking account the variables and errors into the condition thereby satisfying the condition that the product squared of the E3 and the E4 are the same.

Modification-2

Figure 14A:
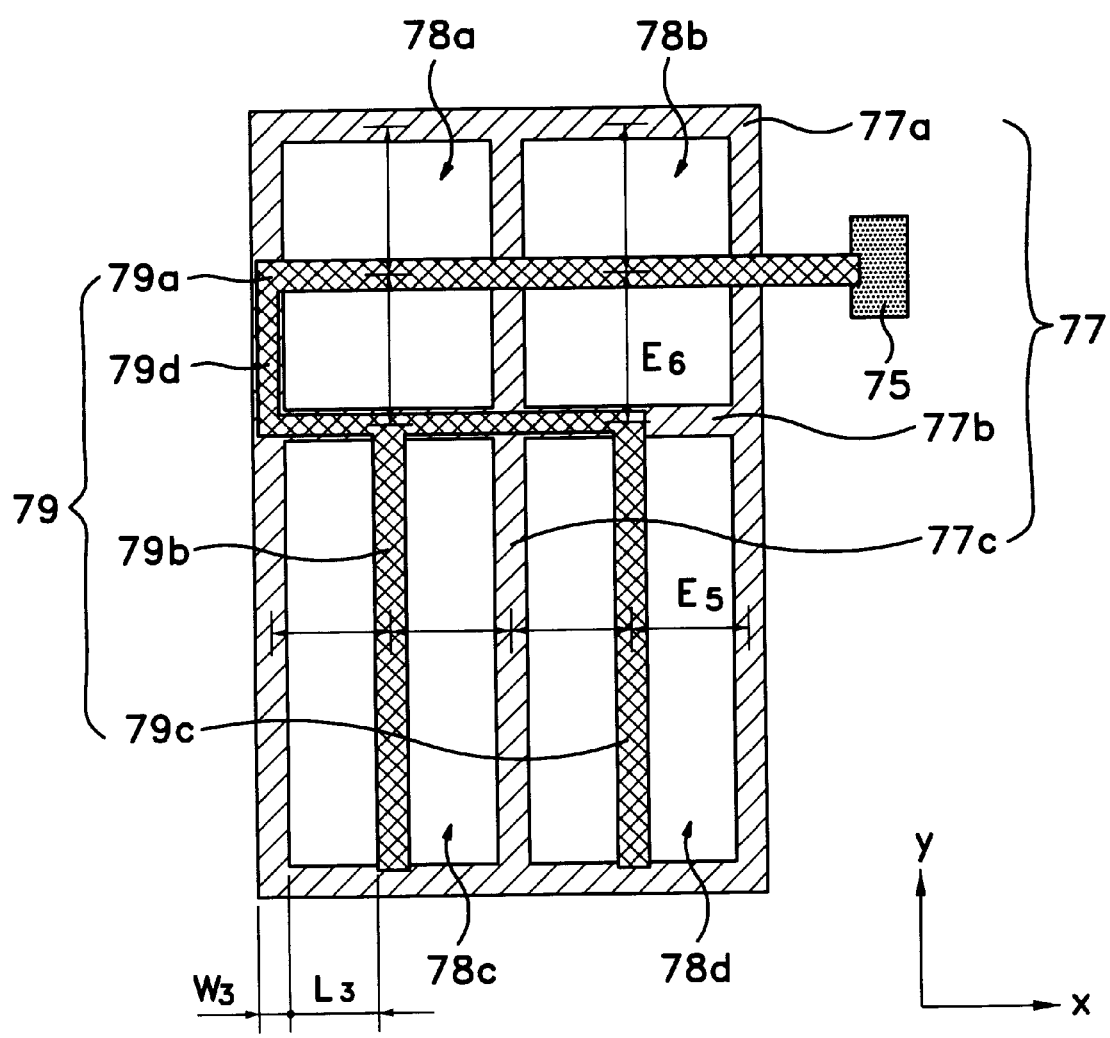
FIG. 14A and FIG. 14B are plane views for showing a structure of a counter electrode and a pixel electrode of a second modification example according to the first embodiment of the present invention.

Referring to FIG. 14A, a counter electrode 77 includes a main electrode 77a of rectangular frame type, a first bar electrode 77b extended to the x direction which divides a space surrounded by the main electrode, a second bar electrode 77c extend to the y direction which divides the space surrounded by main electrode. The space surrounded by the main electrode 77a is divided into a first space 78a, a second space 78b, a third space 78c and a fourth space 78d by the first and second bar electrode 77b and 77c.

A pixel electrode 79 includes a first electrodes 79a extended to the x direction which divides into the first space 78a and the second space 78b; a second electrode 79b extended to the y direction which divides the third space 78c in two; a third electrode 79c extended to the y direction which divides the fourth space 78d in two; and the fourth electrode 79d connecting one portion of the first electrode 79a, the second electrode 79b and the third electrode 79c and overlapping a predetermined portion of the main electrode 77a of the counter electrode 77 and a predetermined portion of the first bar electrode 77b.

Here, the first electrode 79b of the pixel electrode 79 is extended to a selected direction and is connected to a display signal inputting part 75. The display signal inputting part 75 is allowed to connect with any portion of the pixel electrode 79.

Also, a storage capacitor is formed at a region where the counter electrode 77 and the pixel electrode 79 are overlapped.

As described in the above embodiments, the widths of the main electrode 77a of the counter electrode 77, the first bar electrode 77b and the second bar electrode 77c are almost the same and the width is referred as W3. A distance of a counter electrode 77 and the pixel electrode 79 is referenced as L3 and the L3s of the first to the fourth spaces are almost same. The widths of the first to the third electrodes of the pixel electrode 79 are almost the same. Also the widths of the first to the third electrodes and those of the counter electrode 77 are almost same. However, the fourth electrode 79d of the pixel electrode 79 is disposed for connecting one portion of the first electrode 79a to the second electrode 79b and the third electrode 79c and its width is determineated within the range capable of ensuring an appropriate capacitance.

Figure 14B:
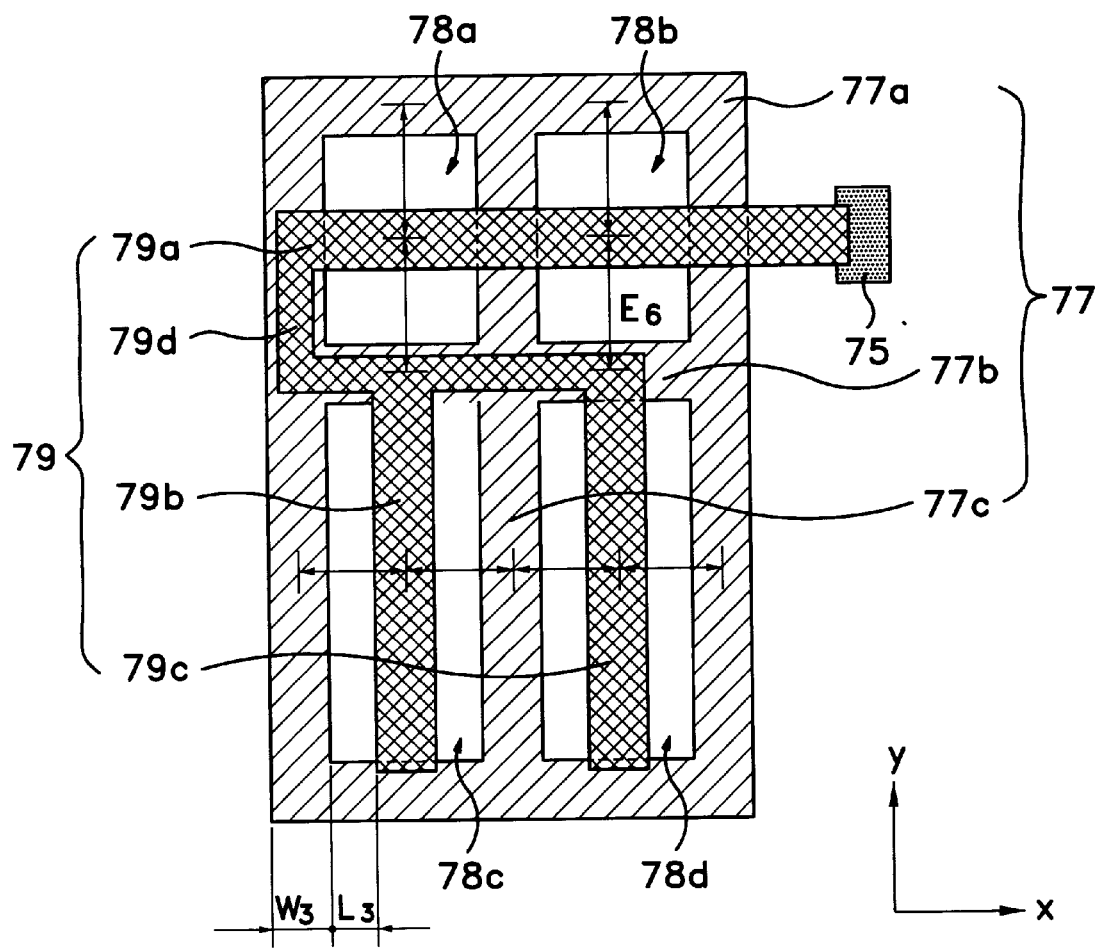

As described above, the values of W3 and L3 can be selected by considering the dielectric anisotropy of the LC molecules. The LC molecules of a positive dielectric anisotropy are used in FIG. 14A when the L3 is larger than the W4. Otherwise, the LC molecules of a negative dielectric anisotropy are used in FIG. 14B when the W3 is larger than the L3 and the counter electrode 77 and the pixel electrode 79 should be made of transparent metal.

An electric field E5 of the x direction is formed in the third space 78c and the fourth space 78d, and an electric field E6 of the y direction is formed in the first space 78a and the second space 78b when a voltage difference is generated between the counter electrode 77 and the pixel electrode 79. Two directions of electric fields being symmetrized each other are simultaneously formed within the sub pixel.

The electric field E5 of the x direction is formed in four regions and the electric field E6 of the y direction is formed in four regions. Here, the ratio of the E5 to the E6 is preferably 1 or 0.6~1.4 for taking account the variables and the errors into the condition.

Modification-3

Figure 15A:
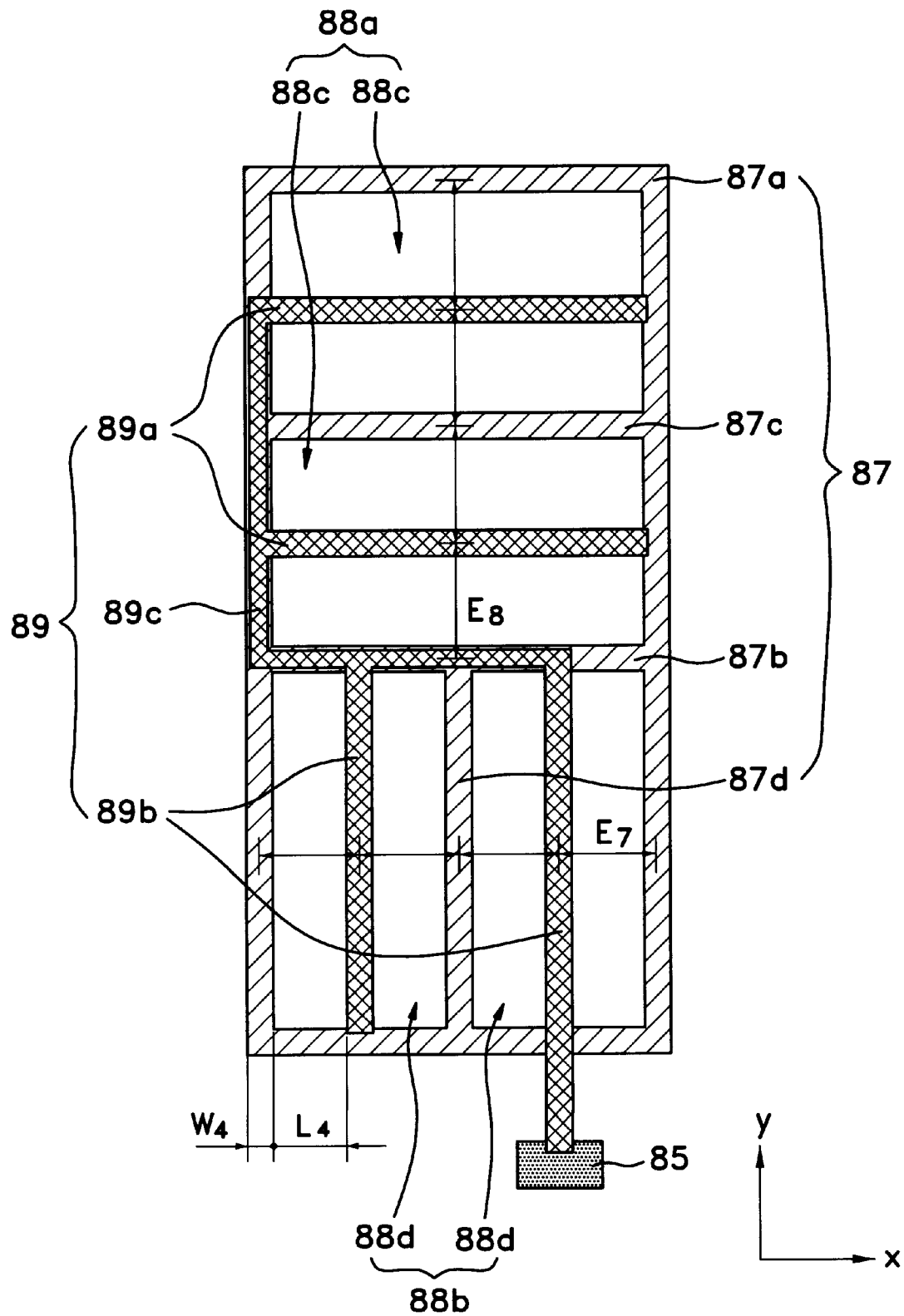
FIG. 15A and FIG. 15B are plane views for showing a structure of a counter electrode and a pixel electrode of a third modification example according to the first embodiment of the present invention.

Referring to FIG. 15A, a counter electrode 87 includes a main electrode 87a of rectangular frame type and a first bar electrode 87b extended to the x direction which divides a space surrounded by the main electrode 87a. The space surrounded by the main electrode 87a is divided into a first space 88a and a second space 88b. The counter electrode 87 further includes a first dividing electrode 87c extended to the x direction which divides the first space 88a in two and a second dividing electrode 87d extended to the y direction which divides the second space X2 in two. The first dividing electrode 87c divides the first space 88a in two third spaces 88c and the second dividing electrode 87d divides the second space 88b in two fourth spaces 88d.

A pixel electrode 89 includes a first electrode 89a extended to the x direction which divides the third space 88c in two; a second electrode 89b extended to the y direction which divides the fourth space 88d in two; and the third electrode 89c connecting one portion of the first electrode 89a, the second electrode 89b, and overlapping a predetermined portion of the main electrode 87a of the counter electrode 87 and a predetermined portion of the bar electrode 87b.

Here, one portion of the second electrode 89c of the pixel electrode 89 is connected to a display signal inputting part 85. The display signal inputting part 85 is allowed to connect with any portion of the pixel electrode 89.

Also, a storage capacitor is formed at a region where the counter electrode 87 and the pixel electrode 89 are overlapped.

As described, the widths of the main electrode 87a of the counter electrode 87, the bar electrode 87b, the first dividing electrode 87c and the second electrode 87d are almost the same and the width is referred as W4. Also, the widths of the first electrode 89a and the second electrode 89b, both of the pixel electrode 89 are substantively the same. Also, the widths of the first and second electrode 89a and 89b, and those of the counter electrode 87 are almost the same. However, the third electrode 89c of the pixel electrode 89 is disposed for connecting the first electrode 89a and the second electrode 89b, and its width is determinated within the range capable of ensuring an appropriate capacitance. A distance of the counter electrode 87 and the pixel electrode 89 is referenced as L4 and the L4s of the third space and the fourth space are almost equal.

Figure 15B:
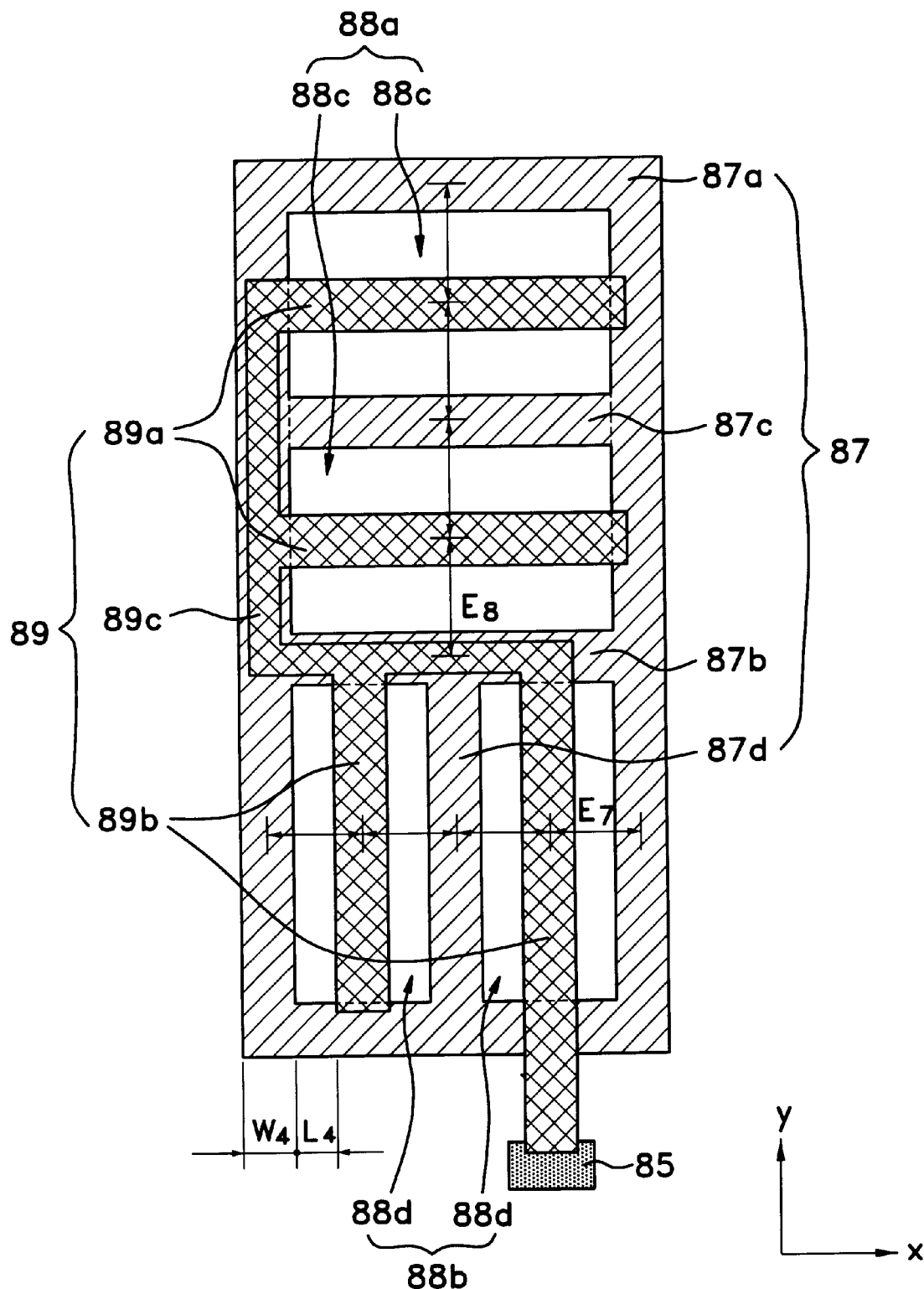

As described above, the values of W4 and L4 can be selected by considering the dielectric anisotropy of the LC molecules. The LC molecules of a positive dielectric anisotropy are used in FIG. 15A when the L4 is larger than the W4. Otherwise, the LC molecules of a negative dielectric anisotropy are used in FIG. 15B when the W4 is larger than the L4, and the counter electrode 87 and the pixel electrode 89 should be made of transparent metal.

An electric field E7 of the x direction is formed in the fourth space 88d, and an electric field E8 of the y direction is formed in the third space 88c when a voltage difference is generated between the counter electrode 87 and the pixel electrode 89. Two directions of electric field being symmetrized each other are simultaneously formed within a sub pixel.

The electric field E7 of the x direction is formed in four regions and the electric field E8 is formed in four regions. Here, the ratio of the E7 to the E8 is preferably 1 or 0.6~1.4.

Modification-4

Figure 16A:
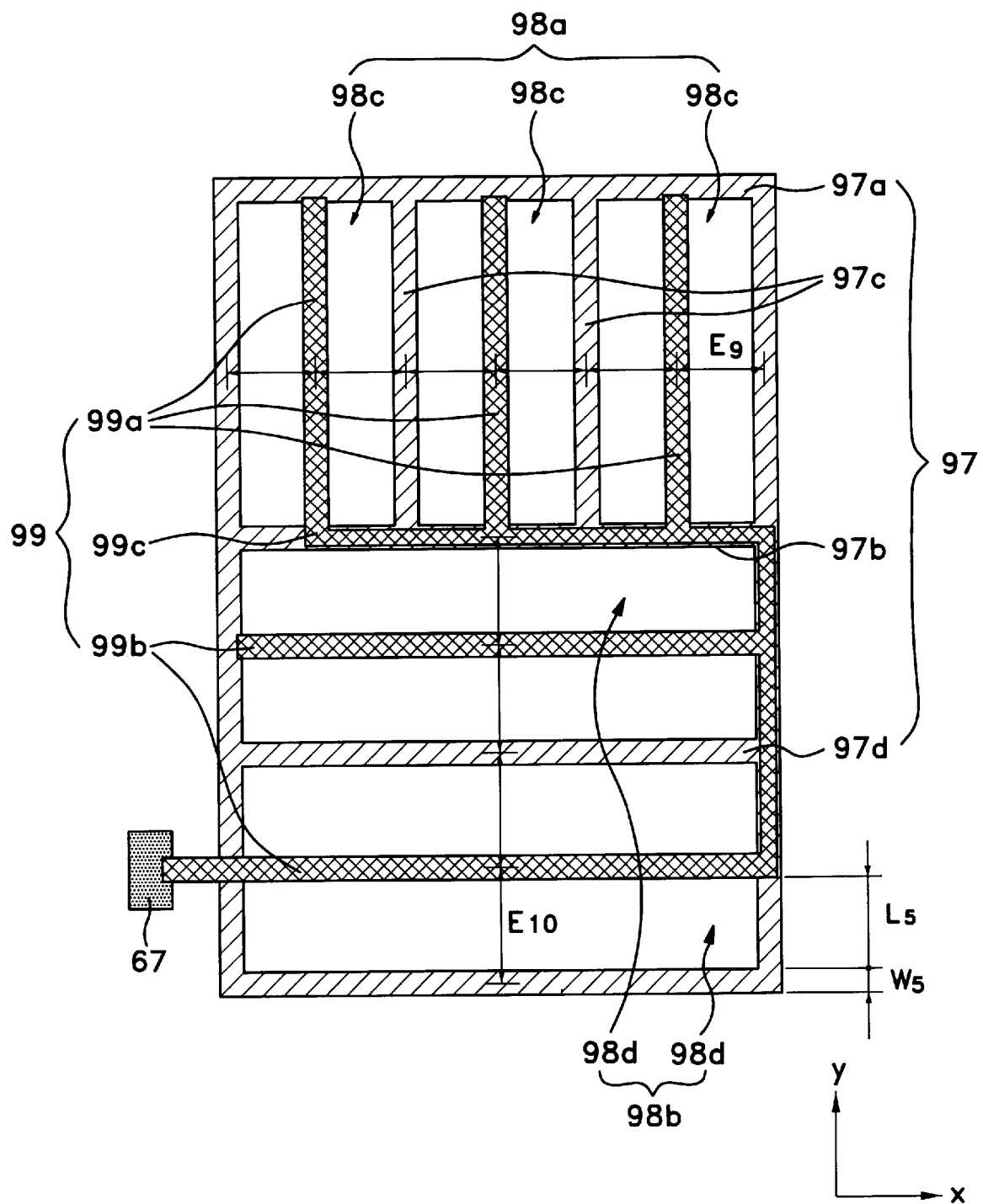
FIG. 16A and FIG. 16B are plane views for showing a structure of a counter electrode and a pixel electrode of a fourth modification example according to the first embodiment of the present invention.
Figure 16B:
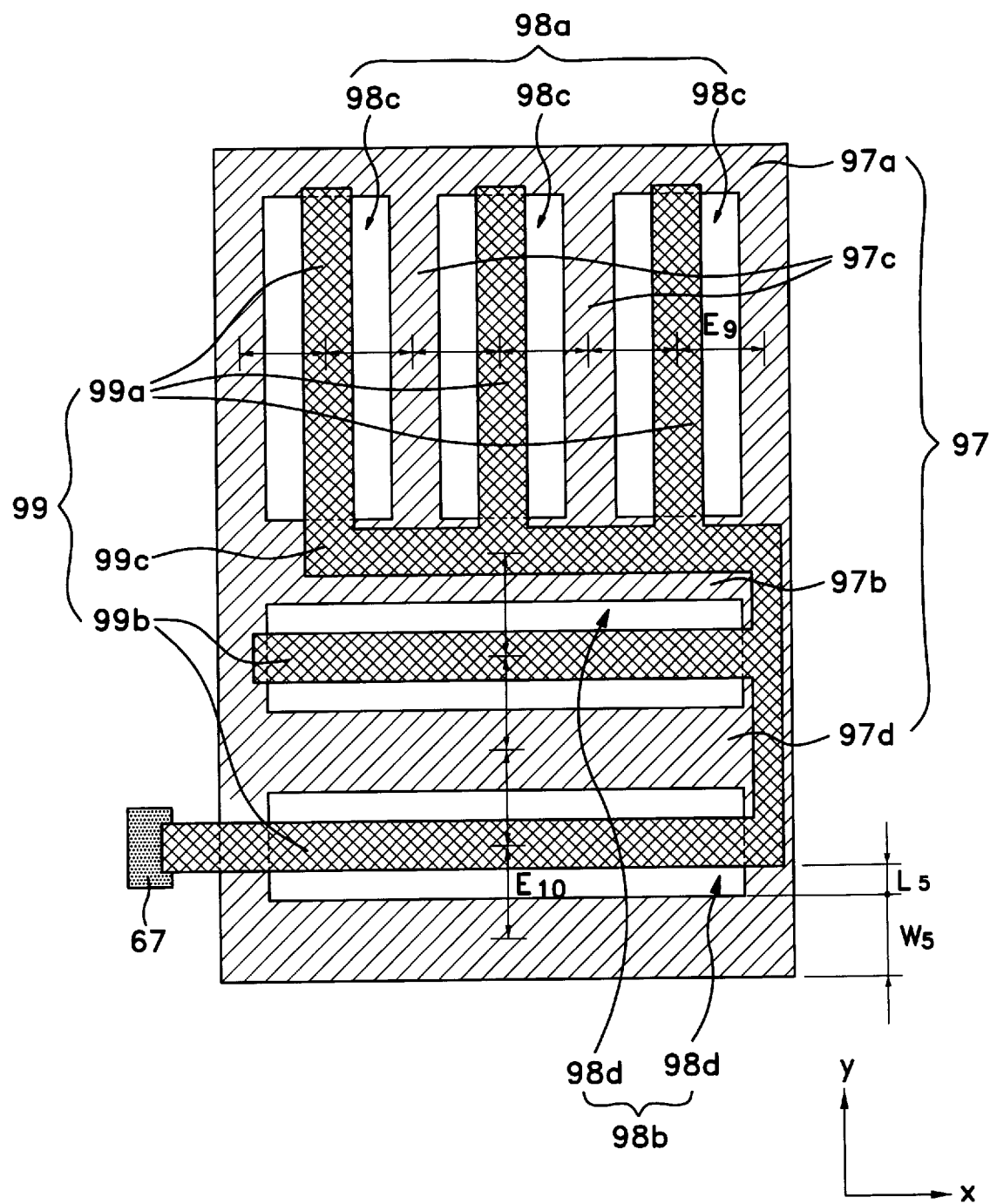

Referring to FIG. 16A, a counter electrode 97 includes a main electrode 97a of rectangular frame type and a bar electrode 97b extended to the x direction which divides a space surrounded by the main electrode 97a. The space surrounded by the main electrode 97a is divided into a first space 98a and a second space 98b. The counter electrode 97 further includes at least one first dividing electrodes 97c extended to the y direction which divide the first space 98a in a plurality of spaces and at least one second dividing electrodes 97d extended to the x direction which divide the second space 98b in a plurality of spaces. In this embodiment, the first dividing electrodes 97c are disposed, for example, two and the second dividing electrode 97d is disposed one. The first dividing electrode 97c divides the first space 98a into three third spaces 98c and the second dividing electrode 97d divides the second space 98b in two fourth spaces 98d. Here, the long axis of the third space 98c is parallel to the y direction and the long axis of the fourth electrode 98d is parallel to the x direction.

A pixel electrode 99 includes a first electrodes 99a extended to the y direction which divides the third space 98c in two; a second electrode 99b extended to the x direction which divides the fourth space 98d in two; and the third electrode 99c connecting some portions of the first electrode 99a and the second electrode 99b, and overlapping a predetermined portion of the main electrode 97a of the counter electrode 97 and a predetermined portion of the bar electrode 97b.

Here, one portion of the second electrode 99b of the pixel electrode 99 is connected to a display signal inputting part 95. The display signal inputting part 95 is allowed to connect with any portion of the pixel electrode 99.

As described, the widths of the main electrode 97a of the counter electrode 97, the bar electrode 97b, the first dividing electrode 97c and the second electrode 97d are almost the same and the width is referred as W5. Also, the widths of the first electrode 99a and the second electrode 99b, both of the pixel electrode 99 are substantively equal. Also, the widths of the first electrode 99a of the pixel electrode 99 and the second electrode 99b, and those of the counter electrode 97 are almost the same. However, the third electrode 99c of the pixel electrode 99 is disposed for connecting the first electrode 99a and the second electrode 99b, and its width is determinated within the range capable of ensuring an appropriate capacitance. A distance of the counter electrode 97 and the pixel electrode 99 is referenced as L5 and the L5s of the third space 98c and the fourth space 98d are almost equal.

As described above, the values of W5 and L5 can be selected by considering the dielectric anisotropy of the LC molecules. The LC molecules of a positive dielectric anisotropy are used in FIG. 16A when the L5 is larger than the W5. Otherwise, the LC molecules of a negative dielectric anisotropy are used in FIG. 16B when the W5 is larger than the L5 and the counter electrode 97 and the pixel electrode 99 should be made of transparent metal.

An electric field E9 of the x direction is formed in the third space 98c, and an electric field E10 of the y direction is formed in the fourth space 98d when a voltage difference is generated between the counter electrode 97 and the pixel electrode 99. Two directions of electric fields being symmetrized each other are simultaneously formed within the sub pixel.

The electric field E9 of the x direction is formed in six regions and the electric field E10 of the y direction is formed in four regions. Here, the ratio of the E9 to the E10 is preferably 2/3 or 0.3~0.8.

Second Embodiment

An Active Matrix Type IPS-LCD Having Dual Domain

Figure 3:
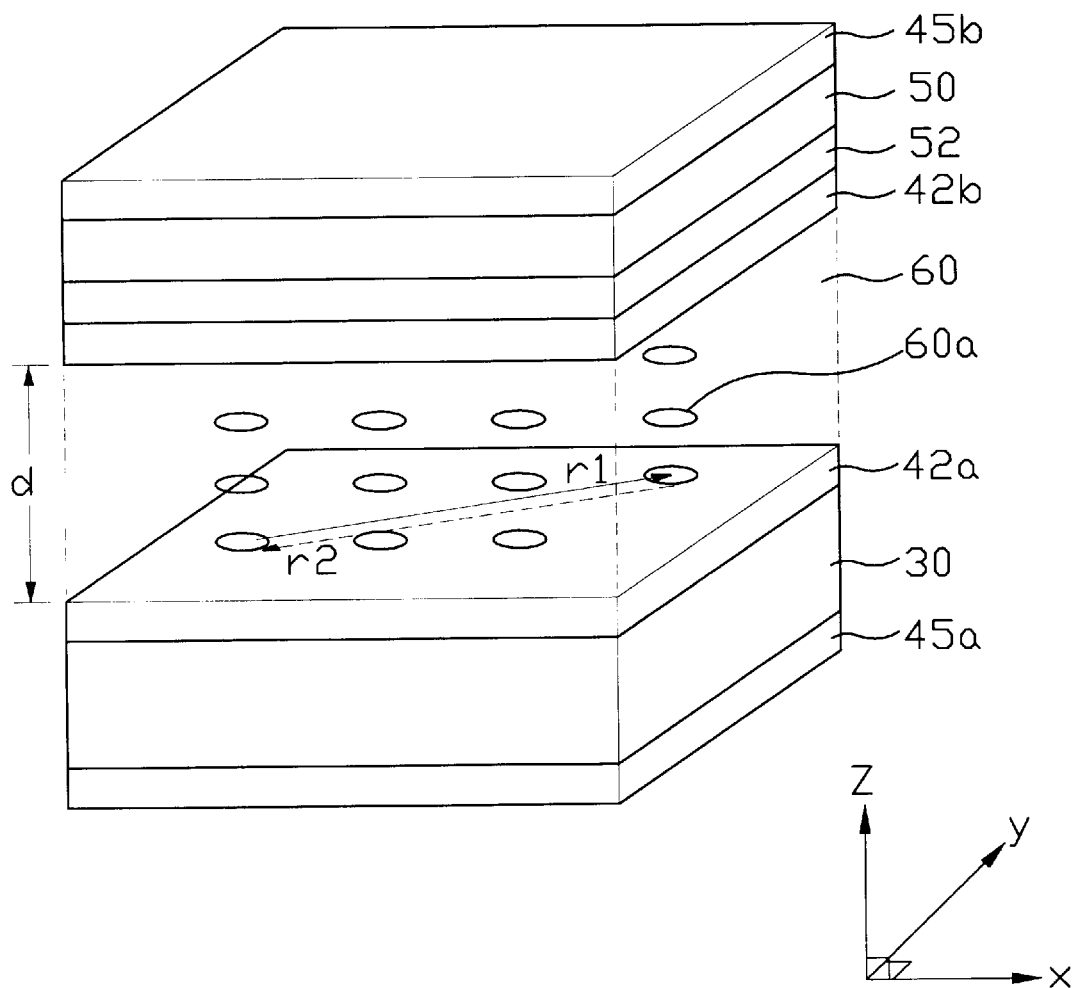
FIG. 3 is a perspective view for showing a second embodiment of the present invention.
Figure 4A:
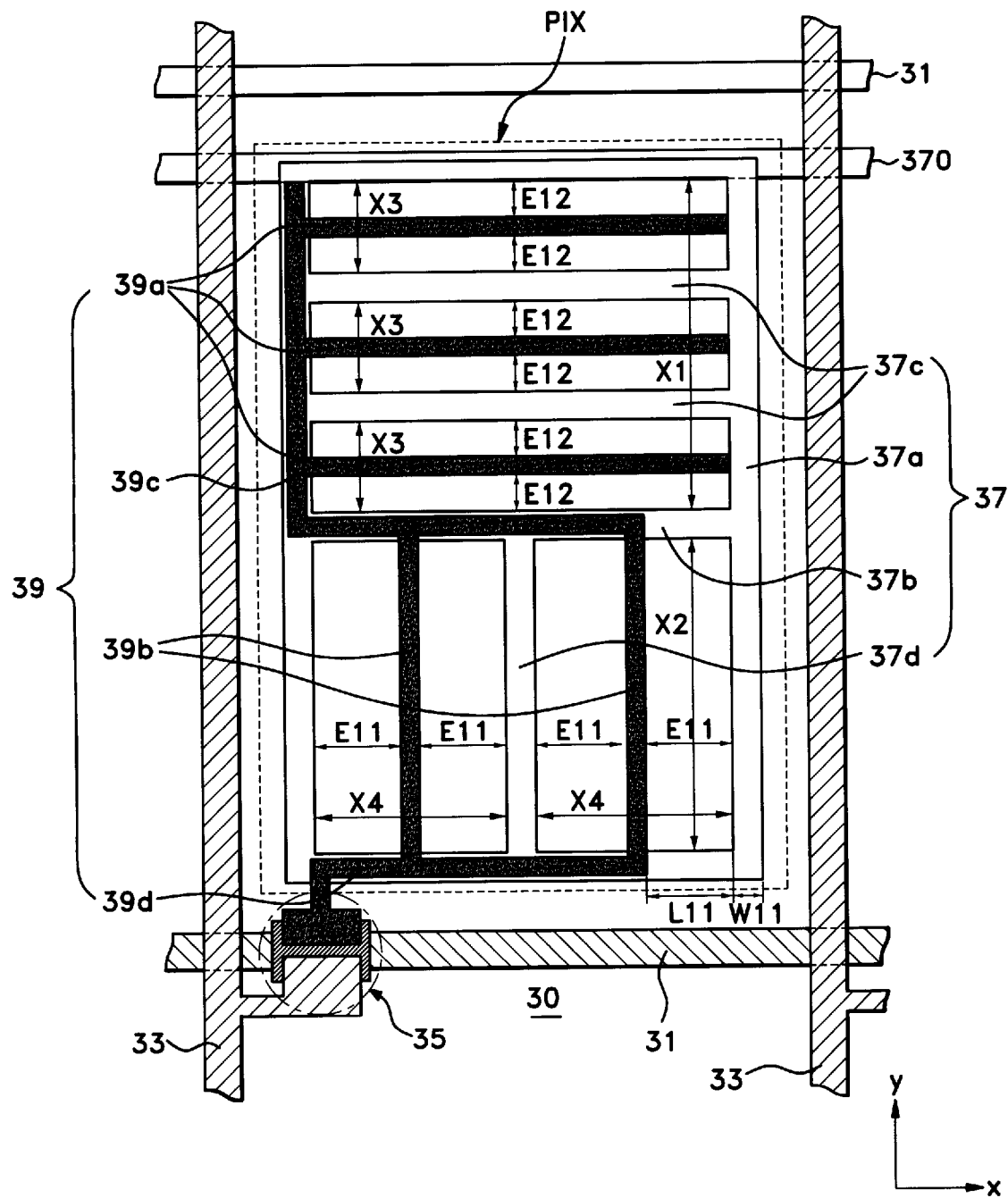
FIG. 4A and FIG. 4B are plane views for showing the second and a third embodiments of the present invention.

Referring to FIG. 3 and FIG. 4A, a lower substrate 30 and an upper substrate 50 are opposed with a predetermined distance (d: hereinafter referred as cell gap). Here, both lower substrate 30 and upper substrate 50 are made of transparent insulating substrates and the cell gap is preferably below 6 $\mu$m or in the range of 4 $\mu$m~4.5 $\mu$m.

A liquid crystal layer 60 comprising a plurality of LC molecules 60a is sandwiched between the lower substrate 30 and the upper substrate 60. The LC molecules 60a of the liquid crystal layer 60 have the characteristics of the dielectric anisotropy $\Delta\epsilon$ and the refraction anisotropy $\Delta n$. The dielectric anisotropy $\Delta\epsilon$ can be selectively used a positive material or a negative material according to the arrangement of electrodes which make drive LC molecules. Further, the value of the refraction anisotropy $\Delta n$ is selected considering to the cell gap and the product of the refraction anisotropy $\Delta n$ and the cell gap, the phase retardation is 0.2 $\mu$m~0.6 $\mu$m. Referring to FIG. 4A, a plurality of gate bus lines 31 being extended to the x direction and a plurality of data bus lines 33 being extended to the y direction are formed in a matrix type over the lower substrate 30 to define a sub pixel "PIX". In drawing, only a couple of the gate bus lines and a couple of the data bus lines are shown.

A thin film transistor 35 as a switching device is disposed at the intersection of the gate bus line 31 and the data bus line 33.

A counter electrode 37 is formed on the lower substrate 30 of each sub pixel PIX. The counter electrode 37 includes a main electrode 37a of rectangular frame type and a bar electrode 37b extended to the x direction which divides a space surrounded by the main electrode 37a. The area surrounded by the main electrode 37a is divided into a first space X1, and a second space X2. The counter electrode 37 further includes at least one first dividing electrodes 37c extended to the x direction which divides the first space X1 into a plurality of spaces and a second dividing electrode 37d extended to the y direction which divides the second space X2 into a plurality of spaces. The first dividing electrodes 37c divide the first space X1 into a plurality of third spaces X3. In this embodiment, the first dividing electrodes 37c are two and the first space X1 is divided into three third spaces X3. Here, the first dividing electrodes 37c are arranged in an equal interval, accordingly the dimensions of the third spaces X3 are equal and the longer direction of the third spaces X3 is parallel to the x direction. The second dividing electrode 37d divides the second space X2 into a plurality of fourth spaces X4. In this embodiment, the second dividing electrode 37d is one, and the second dividing electrode 37d divides the second space 37d into two fourth spaces X4. Here, the second space X2 and the main electrode 37a of the y direction are formed with an equal interval, and the longer direction of the fourth space X4 is parallel to the y direction. Furthermore, the counter electrode 37 is connected to a common electrode wiring 370 where a continual reference voltage is inputted.

A pixel electrode 39 is formed on the lower substrate 30 of each sub pixel PIX. The pixel electrode 39 includes a first electrodes 39a extended to the x direction which divides each third space X3 in two; a second electrode 39b extended to the y direction which divides the fourth space 38d in two; a third electrode 39c connecting one portion of the first electrodes 39a and of the second electrode 39b and overlapping a predetermined portion of the main electrode 37a of the counter electrode 37 and a predetermined portion of the bar electrode 37b; and a fourth electrode 39d connecting the other portions of the second electrodes 37d and connected to the TFT 35. The fourth electrode 39d is overlapped with some portion of the main electrode 37a which is parallel to the x direction.

The widths of the main electrode 37a of the counter electrode 37, the bar electrode 37b, the first electrode 37c and the second electrode 37d are almost the same, and the width is referred as W11. Also, the widths of the first electrode 39a and the second electrode 39b, both of the pixel electrode 39 are substantively the same, and the above widths are equal to the widths of those counter electrodes 37a to 37d. However, the third electrode 39c and the fourth electrode 39d, both of the pixel electrode 39 are disposed for connecting the first electrode 39a and the second electrode 39b, and also connecting the second electrodes 39b to the TFT 35. The widths of the third electrode 39c and the fourth electrode 39d are determinated within the range capable of ensuring an appropriate capacitance. A distance of the counter electrode 37 and the pixel electrode 39 is referenced as L11 and the L11s of the third spaces X3 and the fourth spaces X4 are almost the same.

Figure 4B:
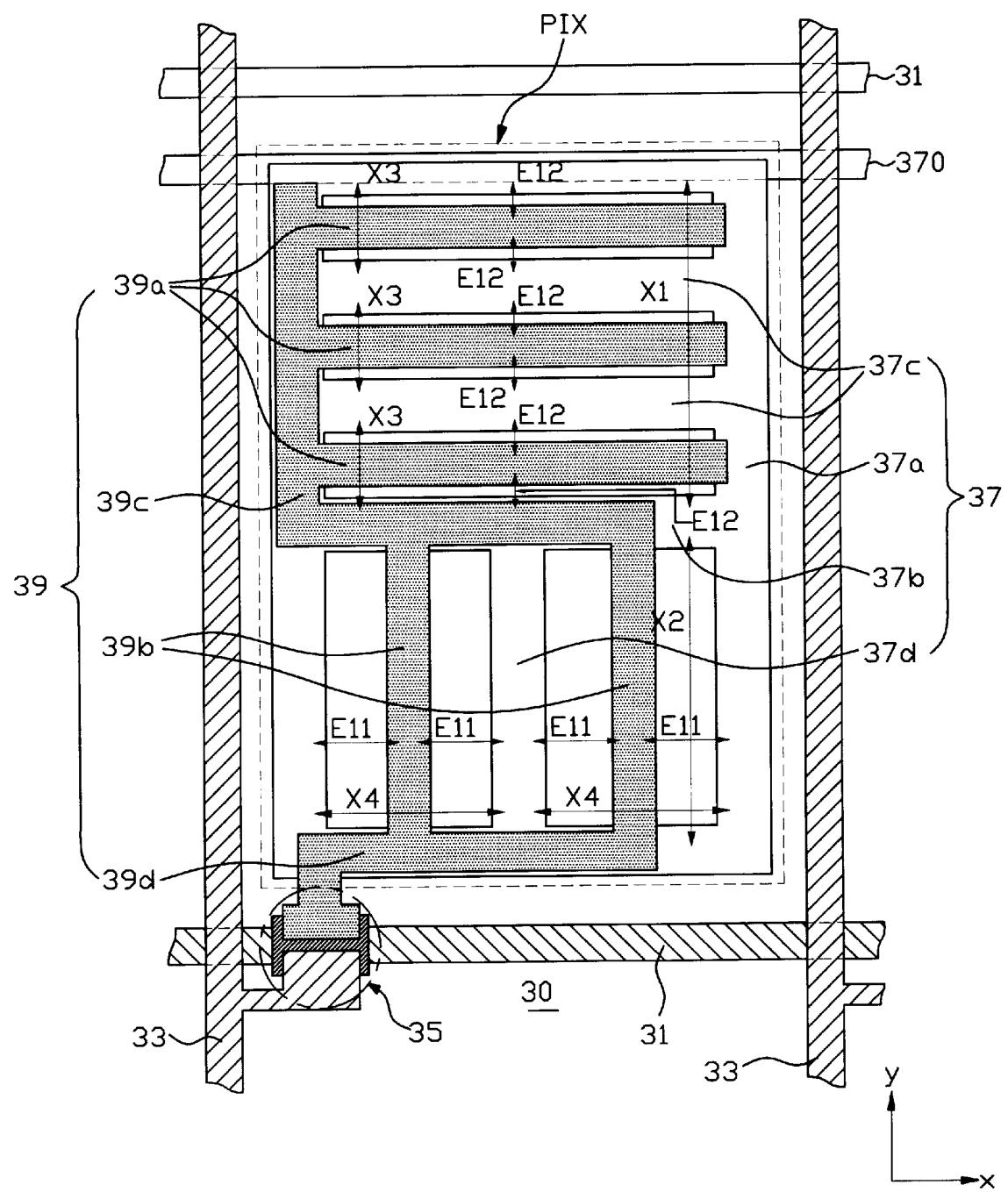

As described above, the values of W11 can be selected by considering the dielectric anisotropy of the LC molecules. For example, the LC molecules of a positive dielectric anisotropy are used in FIG. 4A when the L11 is larger than the W11. Otherwise, the LC molecules of a negative dielectric anisotropy are used in FIG. 4B when the W11 is larger than the L11. At that time the counter electrode 37 and the pixel electrode 39 should be made of transparent metal.

A color filter layer 52 is formed in the inner surface of the upper substrate 50 which is opposed to the lower substrate.

A first alignment layer 42a and a second alignment layer 42b are formed on the inner surface of the lower substrate 30 and on the surface of the color filter layer 52 of the upper substrate 50 respectively. Here, the first alignment layer 42a and the second alignment layer 42b are homogeneous alignment layers that the pre-tilt angle is below 10 degrees. A rubbing process is performed in the first alignment layer 42a and the second alignment layer 42b thereby having rubbing axes r1 and r2 of predetermined directions. So as to obtain the maximum transmittance, the first alignment layer 42a is rubbed so that the angle of its rubbing axis r1 and the x direction is in the range of 35 to 55 degrees, or more preferably 45 degrees. On the other hand, the second alignment layer 42b is rubbed so that its rubbing axis r2 is formed anti-parallel to the rubbing axis r1 of the first alignment layer 42a.

A first polarizing plate 45a and a second polarizing plate 45b are formed on the outer surfaces of the lower substrate 30 and of the upper substrate 50 respectively. The polarizing plate 45a is arranged such that its polarizing axis is parallel to the rubbing axis of the first alignment layer 42a and the second polarizing plate 45b is arranged such that its polarizing axis is perpendicular to the polarizing axis of the first polarizing plate 45a.

Figure 5:
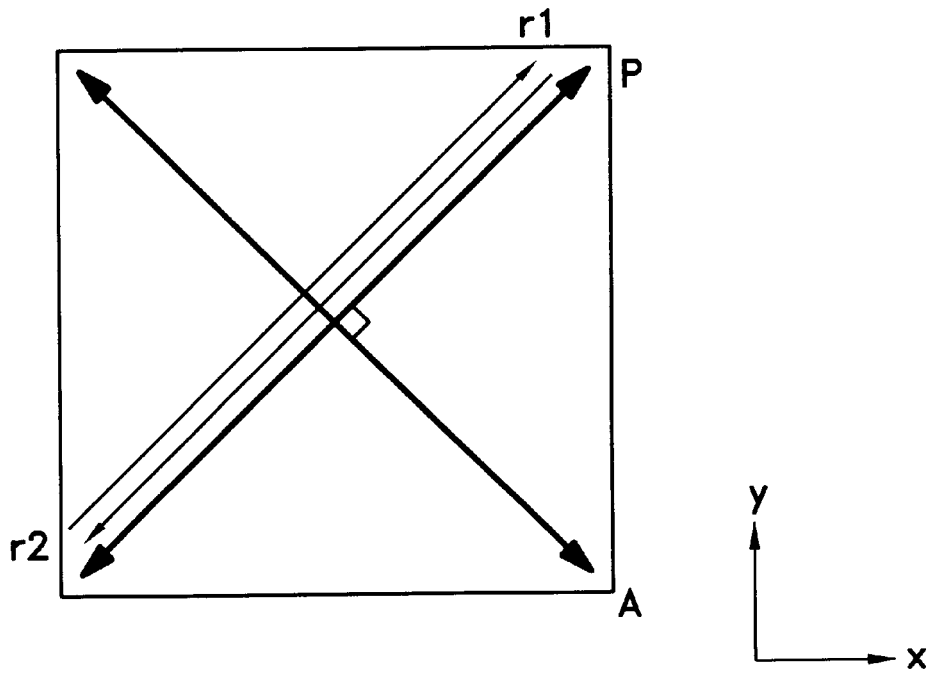
FIG. 5 illustrates the directions of rubbing axes of alignment layers and polarizing axes of polarizing plates according to the second embodiment of the present invention.

Here, FIG. 5 illustrates the directions of rubbing axes r1 and r2 of the first alignment layer 42a and the second alignment layer 42b and the directions of polarizing axes P and A of the first polarizing plate 45a and the second polarizing plate 45b. The angle of the rubbing axes r1 and r2 is 180 degrees. The polarizing axis P of the first polarizing plate 45a is formed parallel to the rubbing axis r1 of the first alignment layer 42a and the polarizing axis A of the second polarizing plate 45b is perpendicular to the polarizing axis P of the first polarizing plate 45a.

Hereinafter, an operation of the liquid crystal display as above will be described according to the present invention.

First of all, under the influence of the first alignment layer 42a and the second alignment layer 42b, the long axes of the LC molecules 60a are aligned parallel to the surfaces of the lower substrate 30 and the upper substrate 50 before forming an electric field between the counter electrode 37 and the pixel electrode. At that time, long axes of LC molecules are parallel to the rubbing axes r1 and r2 of the adjoining alignment layers 42a and 42b parallel each other. Therefore the incident light passed through the first polarizing plate 45a and the liquid crystal layer 60 does not changed its polarizing state. Then the incident light passed the liquid crystal layer 60 is absorbed by the second polarizing plate having a polarizing axis which is perpendicular to the polarizing axis of the first polarizing plate 45a. The screen has dark state.

On the other hand, the TFT 35 arranged at the intersection of the gate bus line 31 and the data bus line 33 is turned on when the gate bus line 31 is selected and the display signal is applied to the data bus line 33. Then, the display signal of the data bus line 33 is transmitted to the pixel electrode 39 thereby forming electric fields E11 and E12 between the counter electrode 37 and the pixel electrode 39 wherein, to the counter electrode 37 is inputted a reference signal.

Here, the electric field E12 of the y direction is formed in those regions: the third spaces X3, i. e. between the main electrode 37a being parallel to the x direction and the first electrode 37c, between the first dividing electrode 37c and the first electrode 39a, and between the bar electrode 37b and the first electrode 39a. On the other hand, the electric field E11 of the x direction is formed in those regions: the fourth spaces X4, i. e. between the main electrode 37a being parallel to the y direction and the second electrode 39b, and between the second dividing electrode 37d and the second electrode 39b. Therefore an electric field E11 of the x direction and an electric field E12 of the y direction are simultaneously formed within a sub pixel PIX. At this time, ideally the ratio of the electric field E11 and the electric field E12 is 3/2 or preferably 1.2~1.8 since the electric field E11 of the x direction is formed in four regions and the electric field E12 of the y direction is formed in six regions.

With this formation of the electric fields as described above, the directions of the long axes of the LC molecules or alternatively short axes thereof are parallel to the electric fields in accordance with the characteristics of the dielectric anisotropy of the LC molecules.

An example of driving the liquid crystal display follows hereinafter in case the LC molecules are of positive dielectric anisotropy. The long axes of the LC molecules in the third spaces X3 are twisted along the counterclockwise direction so as to parallel with the electric field E12. On the other hand, the long axes of the LC molecules in the fourth spaces X4 are twisted along the clockwise direction so as to parallel with the electric field E11. Therefore dual domain composed of a first domain and a second domain are formed within the sub pixel. Wherein, the long axis of the first domain is formed parallel to the y direction and the long axis of the LC molecules in second domain is parallel to the x direction.

Another example of driving the liquid crystal display follows below in case the LC molecules are of negative dielectric anisotropy. The short axes of the LC molecules in the fourth space X4 are twisted along the clockwise direction so as to parallel with the electric field E12. On the other hand, the short axes of the LC molecules in the fourth space X4 are twisted along the counterclockwise direction so as to parallel with the electric field E12. Therefore, the dual domain is also formed when the LC molecules are of negative dielectric anisotropy.

The polarizing state is changed owing to the LC molecules in the first and the second domains while the incident light is passing through the first polarizing plate 45*a* to the liquid crystal layer 60. Here, both domains and the polarizing axis of the first polarizing plate 45*a* have predetermined angles of degree. Further, the incident light passed through the liquid crystal layer 60 also has a predetermined angle of degree with the polarizing axis of the second polarizing plate 45*b* and passes the second polarizing plate 45*b*. The screen has white state.

Figure 6:
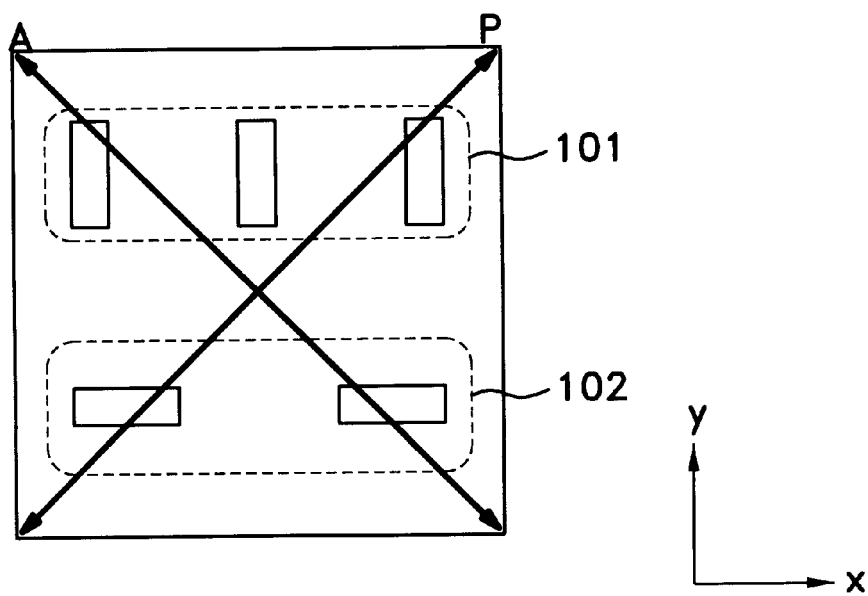

At this time, according to the dual domain formed within a sub pixel, the long axes and the short axes of the LC molecules are observed at the same time by the user in every azimuth angles of the screen. Herein, the reference numeral 101 is a first domain and the 102 is a second domain, That is, as shown in FIG. 6, the LC molecules in one half region of a sub pixel are aligned parallel to the y direction, and those in the rest of the sub pixel are aligned parallel to the x direction. Consequently, the dual domain are formed the sub pixel PIX. Accordingly, the long axes and the short axes of the LC molecules are observed at the same time by the views from everywhere in the screen. The refractive anisotropy of the LC molecules is compensated thereby preventing color shift in the LC molecules.

The foregoing structures of counter electrode and pixel electrode of the above described in the modifications are also applicable to the active matrix type LCD of this embodiment.

Third Embodiment

Active Matrix Type IPS VA-LCD Having Multi-Domain

Figure 7:
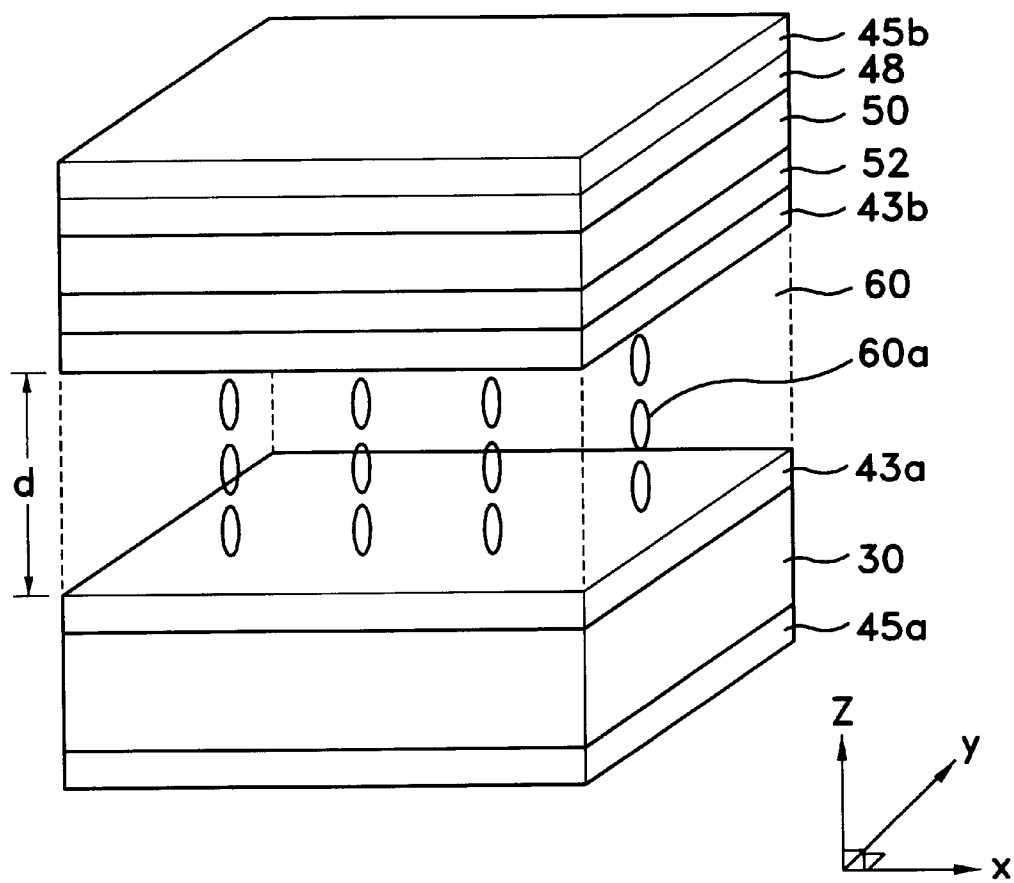
FIG. 7 is a perspective view for showing a third embodiment of the present invention.
Figure 8:
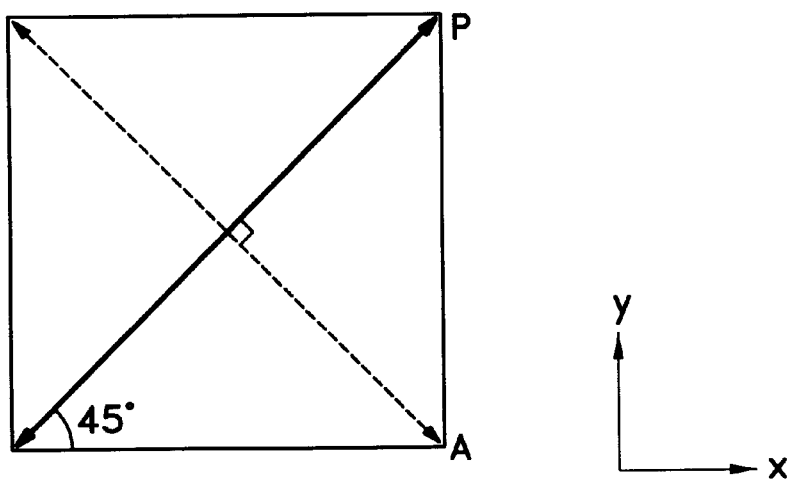
FIG. 8 illustrates a direction of polarizing axes of polarizing plates according to the third embodiment of the present invention.

Referring to FIG. 7 and FIG. 4A, a lower substrate 30 and an upper substrate 50 are opposed with a predetermined distance (d: hereinafter referred as cell gap). Here, both lower substrate 30 and upper substrate 50 are made of transparent insulating substrates and the cell gap is preferably below 6 μm or in the range of 4 μm~4.5 μm. A liquid crystal layer 60 comprising a plurality of LC molecules 60*a* is sandwiched between the lower substrate 30 and the upper substrate 50. The LC molecules 60*a* of the liquid crystal layer 60 have the characteristics of the dielectric anisotropy Δϵ and the refraction anisotropy Δn. The dielectric anisotropy Δϵ can be selectively used a positive material or negative material according to the arrangement of electrodes which make drive LC molecules. Further, the value of the refraction anisotropy Δn is selected considering to the cell gap and the product of the refraction anisotropy Δn and the cell gap, the phase retardation is in the range of 0.2 μm~0.6 μm.

Referring to FIG. 4A, a gate bus line 31, a data bus line 33, a TFT 35, counter electrode 37 and a pixel electrode 39 are formed in the inner surface of the lower substrate in the same manner as the second embodiment. Otherwise, those modifications of the first embodiment can be replaced as the above counter electrode and the pixel electrode structure.

A color filter layer 52 is formed in the inner surface of the upper substrate 50 which is opposed to the lower substrate 30.

A first alignment layer 43*a* and a second alignment layer 43*b* are formed on the inner surface of the lower substrate 30 and on the surface of the color filter layer 52 of the upper substrate 50 respectively. Here, the first alignment layer 43*a* and the second alignment layer 43*b* are homeotropic alignment layers that the pre-tilt angle is 85 to 95 degrees, or more preferably 90 degree. No rubbing process is required in the first alignment layer 43*a* and the second alignment layer 43*b*, both are homeotropic alignment layers.

A first polarizing plate 45*a* and a second polarizing plate 45*b* are formed on the outer surfaces of the lower substrate 30 and of the upper substrate 50 respectively. The polarizing axis of the first polarizing plate 45*a* has approximately 45 degrees with the x axis and the polarizing axis of the second polarizing plate 45*b* is perpendicular to the polarizing axis of the first polarizing plate 45*a* so that the LC molecules can move by 45 degrees during the formation of the electric field thereby obtaining the maximum transmittance.

A phase compensating plate 48 is sandwiched between the second polarizing plate 45*b* and the upper substrate 50. The phase compensating plate 48 is a liquid crystal layer having LC molecules of negative refraction anisotropy and the refraction anisotropy of vertically aligned LC molecules of liquid crystal layer 60 is compensated. At this time, the phase retardation of the phase compensating plate 48 is the same value with that of the liquid crystal layer 60. Here, the phase retardation means the product of the thickness of the phase compensating plate and the refraction anisotropy.

Hereinafter, an operation of IPS VA-LCD as above is described according to the present invention.

First of all, under the influence of the first alignment layer 43*a* and the second alignment layer 43*b*, the long axes of the LC molecules 60*a* are perpendicular to the surfaces of the lower substrate 30 and the upper substrate 50 before forming an electric field between the counter electrode 37 and the pixel electrode. Consequently, the incident light passed through the first polarizing plate 45*a* and the liquid crystal layer 60 does not changed its polarizing state. Then the incident light passed through the liquid crystal layer 60 is absorbed by the second polarizing plate having a polarizing axis which is perpendicular to the polarizing axis of the first polarizing plate 45*a*. The screen has dark state.

In the mean time, as described in the second embodiment, the electric field E12 of the y direction is formed in the third space X3 within the sub pixel PIX and the electric field E11 is formed in the fourth space X4 when a voltage difference is generated between the counter electrode 37 and the pixel electrode 39.

Then, the LC molecules move so that their optical axes (long axis or short axis) are formed parallel to the electric field. The screen has white state. Here, the homeotropic alignment layers are used for the alignment layers 43*a* and 43*b* in this embodiment. The LC molecules in the center line of the electric field maintain the states prior to forming the electric field. The LC molecules in both edges of the center line of the electric field are tilted down so that their optical axes formed parallel to the electric field.

Figure 9A:
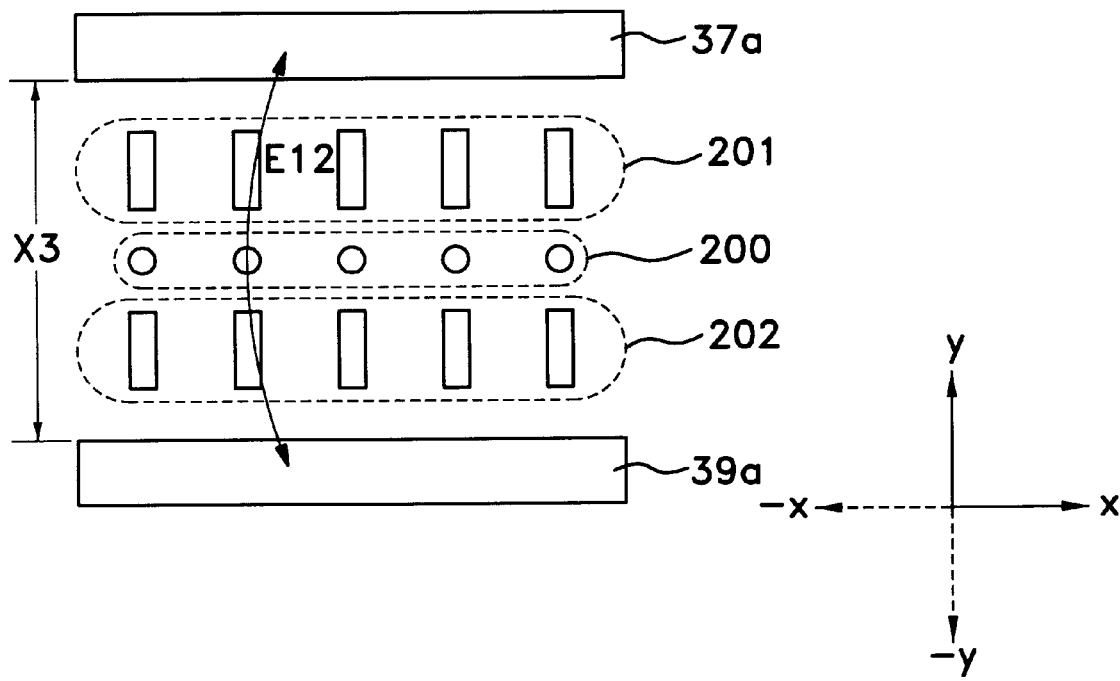

As a result, for example when the dielectric anisotreopy of LC molecules 60*a* is positive, as shown in FIG. 9A, the first domain region 201 and the second domain region 202 are formed in the third spaces X3 where the counter electrode 37 and the pixel electrode 39, both of the x direction are disposed respectively. Wherein the first domain 201 is comprised of the LC molecules which are tilted down toward the −y direction based on a center line of the electric field E12 and the second domain 202 is comprised of the LC molecules which are tilted down in the +y direction based on the center line. As well known, the LC molecules in the center line of the electric field E11 maintain their initial homeotropic alignment state according to the van der Waals Forces thereby forming a disclination line 200. At this time, the disclination line 200 acts as the boundary of the above domains of the IPS VA-LCD.

Figure 9B:
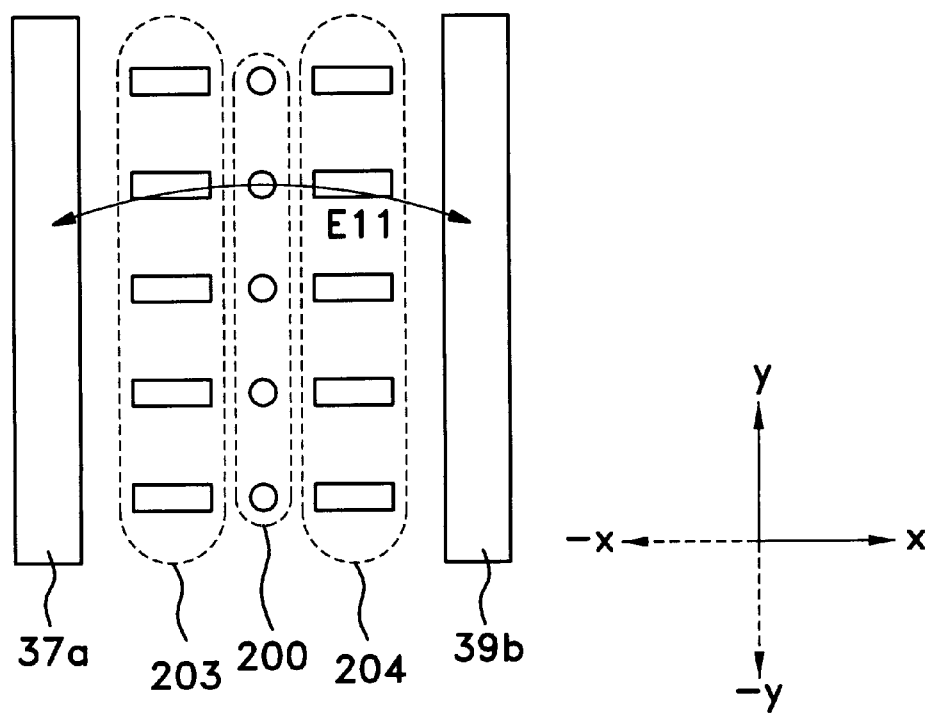

Referring to FIG. 9B, the third domain region 203 and the fourth domain region 204 are formed in the fourth space X4 where the counter electrode 37 and the pixel electrode 39, both of the y direction are disposed. Wherein, the third domain 203 is comprised of the LC molecules which are tilted down in the +x direction based on the center line of the electric field E11 and the fourth domain 204 is comprised of the LC molecules which are tilted down in the −x direction based on the center line. As well known, also the LC molecules in the center line of the electric field E12 maintain their initial homeotropic alignment state thereby forming the disclination line 200.

As a result, there are formed four domains within a sub pixel in case the IPS VA-LCD uses the homeotropic alignment layer. Both long and short axes are shown simultaneously in every azimuth angles and the color shift is prevented by compensating the refraction anisotropy of the LC molecules 60a.

Figure 10:
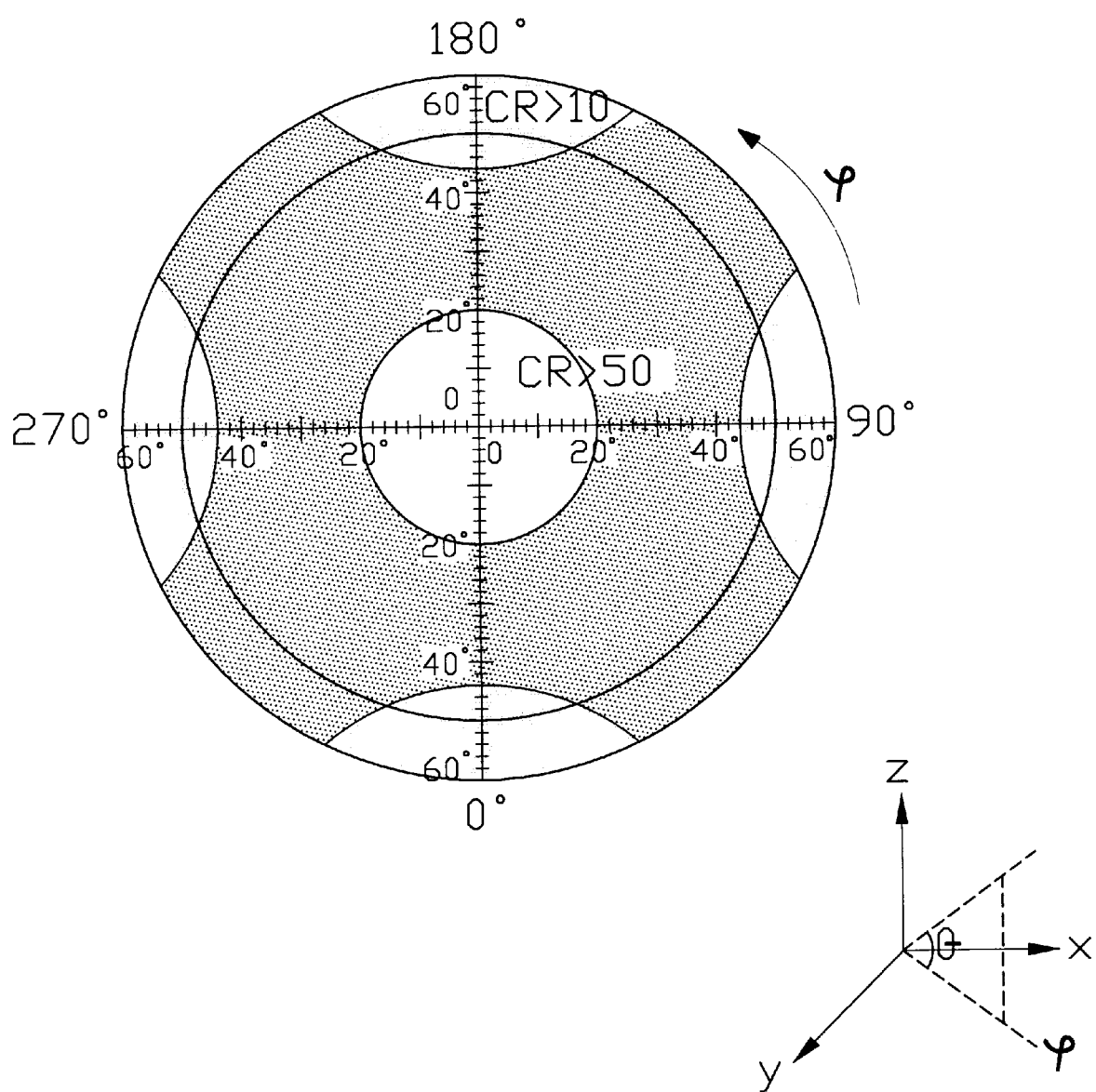
FIG. 10 illustrates an iso-contrast ratio of viewing range according to the third embodiment of the present invention.

FIG. 10 illustrates the contrast ratio corresponding to viewing angles of IPS VA-LCD in accordance with this embodiment. The contrast ratio CR is above 10 in most of the azimuth angles since the LC molecules are driven by the in-plan field. The mirror plan symmetries are appeared in the azimuth angles in which the contrast ratio is above 50. Remarkably enhanced viewing angle characteristics are shown in the direction coinciding with the polarizing plate, namely in the vicinities of 45, 135, 225 and 315 degrees.

Furthermore, the IPS VA-LCD of this embodiment comparable to the IPS VA-LCD of the above second embodiment, requires no rubbing process so as to obtain multi-domain. Also a quick response time is obtainable by using the homeotropic alignment layer 43a and 43b.

Fourth Embodiment

An Active Matrix Type IPS VA-LCD Having Uniformity of Electric Field Arrangement and Multi-Domain An upper substrate, alignment layers and polarizing plates of this embodiment have the same structure with the IPS VA-LCD of the third embodiment of the present invention except counter electrode structure of the lower substrate.

In the IPS VA-LCD having the lower substrate structure as described in FIG. 4A, the third space X3 and the fourth space X4 were the main regions of electric field formation. However, a edge electric field which is not desirable is formed at a corner consisted of the counter electrode 37 and the pixel electrode 39 within the third space X3 and the fourth space X4. This edge electric field is formed obliquely to the major electric fields, E11 of the x direction and E12 of the y direction. The LC molecules in the above corner region are moved along directions not desirable.

Furthermore, the intensity of the edge electric field increases when a high voltage is applied to the counter electrode 37 and the pixel electrode 39, which breaks the balance of the major electric fields E11 and E12. As a result, the center of the major electric field E moves and the disclination line is biased to aside.

If the disclination line is biased as above, it is very difficult to obtain a complete dual or multi domain since it is not formed in the center of the electric field forming region.

Figure 11:
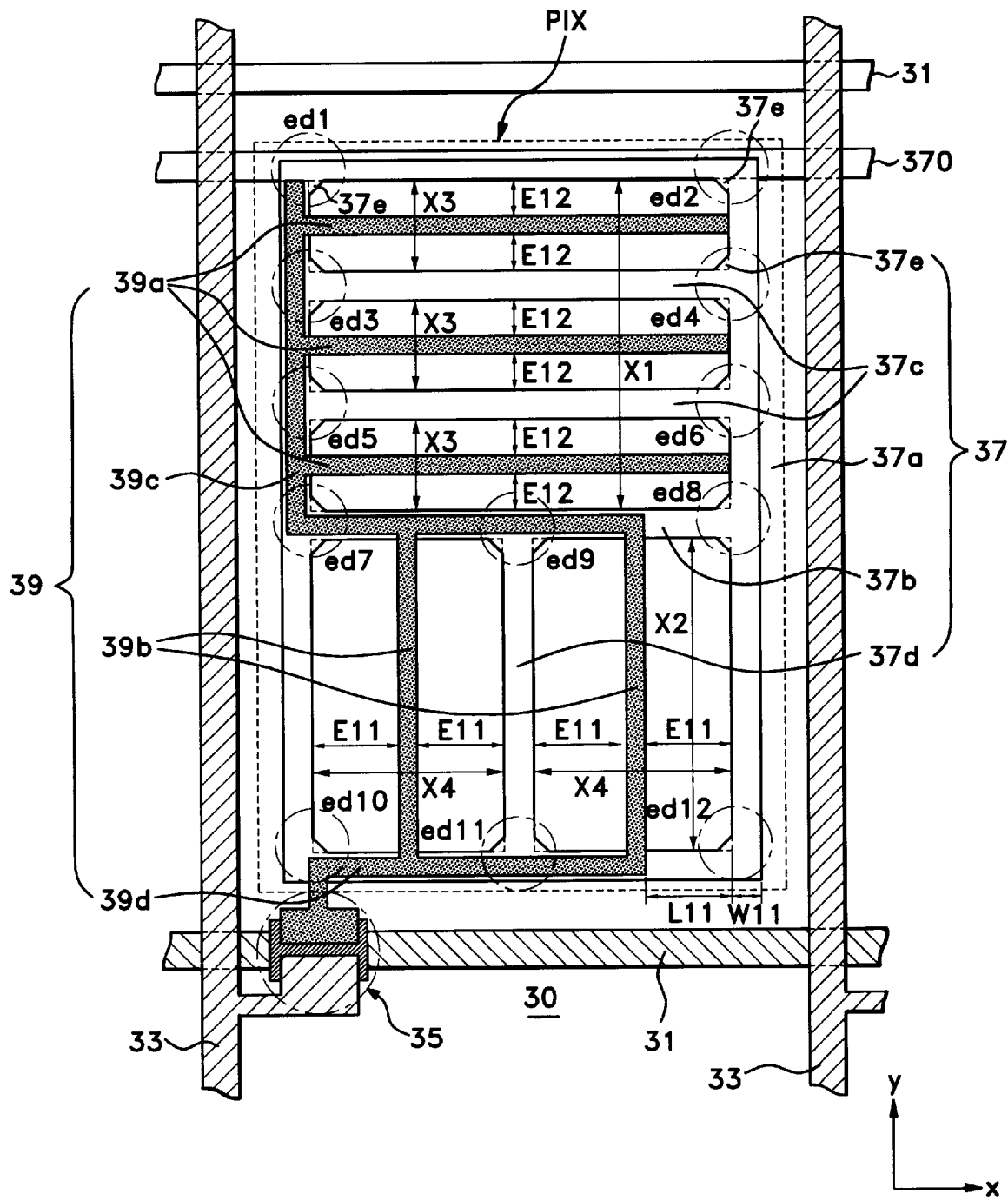
FIG. 11 is a plane view for showing a lower substrate of an LCD according to a fourth embodiment of the present invention.

So as to provide a uniformity of the electric field arrangement, as shown in FIG. 11, ribs 37e of right-angled triangle are inserted at the respective corners of the counter electrode 37 (ed1, ed2, ed3, ed4, ed5, ed6, ed7, ed8, ed9, ed10, ed11, and ed12). Here the hypotenuse of the rib 37e can be curved toward inside.

The parasitic electric field is decreased by adopting this configuration to the corner region since the intersection angle in the corner regions becomes an obtuse angle. Accordingly, the electric fields are uniformly formed between the counter electrode 37 and the pixel electrode without distorting the main electric fields E11 and E12, therefore the disclination line is disposed at the respective central regions of the third space X3 and the fourth space X4. As a result, a complete quadruple domain is obtained thereby preventing color shift.

Here, the ribs 37e can be applied to IPS-LCD shown FIG. 3 and 4A, therefore occurrence of parasitic electric field generated IPS-LCD is decrease.

Fifth Embodiment

An Active Matrix Type IPS-LCD or IPS VA-LCD Reducing Cross Talk and Having Dual Or Multi-Domain In this embodiment, an LCD preventing crosstalk between the data bus line and the pixel electrode is provided. The lower and the upper substrate structure of the LCD is the same as the structures described in FIG. 3 in case of IPS mode, and the structure thereof is the same as the structures described in FIG. 7 in case of IPS-VA mode.

The gate bus line 31, data bus line 33 and the TFT 35 formed on the lower substrate respectively have the same structure with that of FIG. 4A except some portions in the counter and pixel electrodes structure.

Figure 12A:
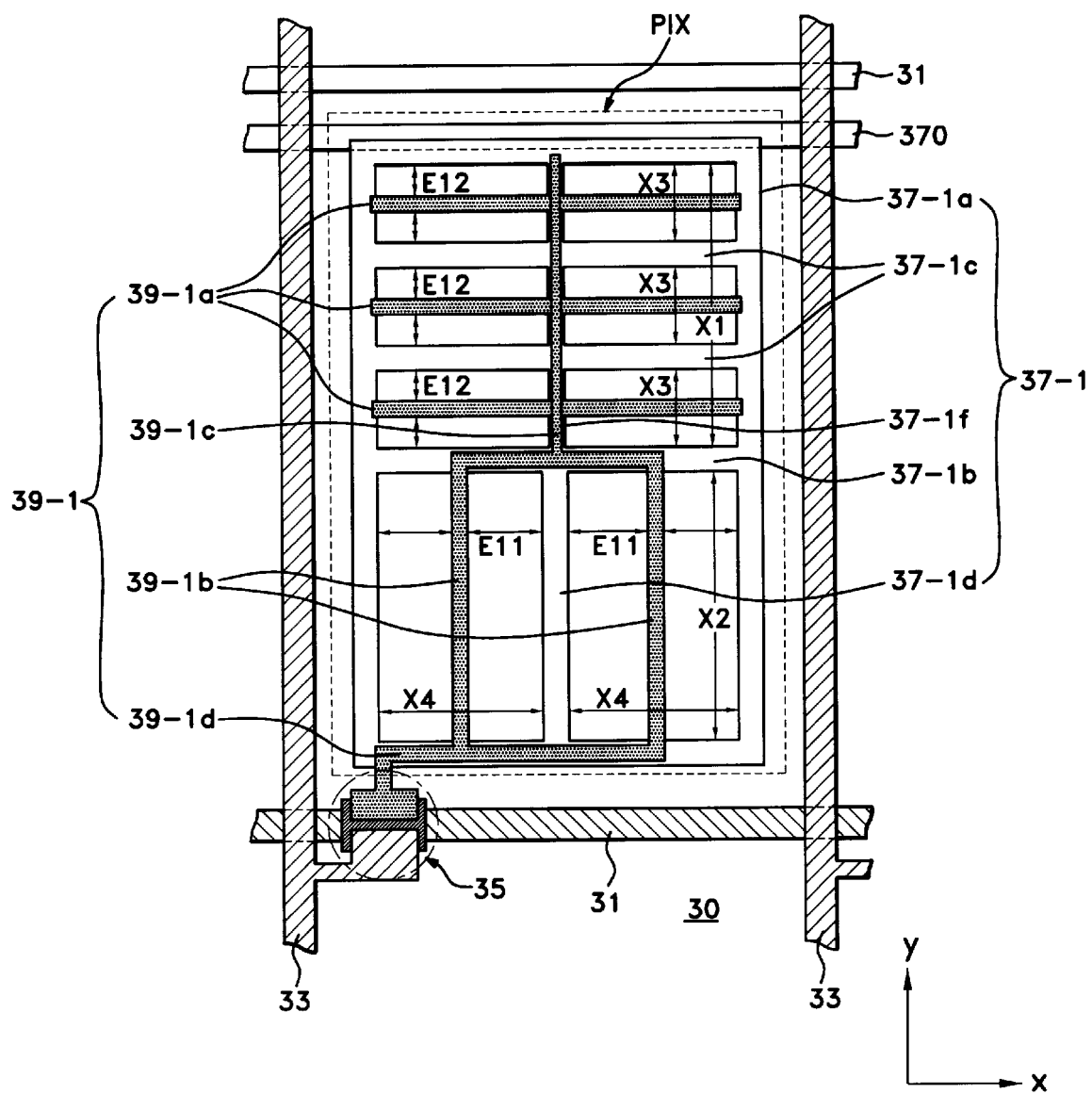
FIG. 12A and FIG. 12B are plane views for showing a lower substrate of an LCD according to the fifth embodiment of the present invention.

Referring to FIG. 12A, the counter electrode 37-1 includes a a main electrode 37-1a of rectangular frame type and a bar electrode 37-1b extended to the x direction which divides a space surrounded by the main electrode 37-1a. The space surrounded by the main electrode 37-1a is divided into a first space X1 and a second space X2. The counter electrode 37-1 further includes a plurality of first dividing electrode 37-1c extended to the x direction which divides the first space X1 in a plurality of spaces and a second dividing electrode 37-1d extended to the y direction which divides the a plurality of second space X2 in a plurality of spaces. The first dividing electrode 37-1c divides the first space X1 into a plurality of third spaces X3 and the second dividing electrode 37-1d divides the second space X2 into a plurality of fourth spaces X4. In this embodiment, a third dividing electrode 37-1f extended to the y direction which divides each third space X3 in two is also included in the counter electrode 37-1. Consequently the third dividing electrode 37-1f is perpendicular to the first dividing electrode 37-1c. Furthermore, the counter electrode 37-1 is connected to a common electrode wiring 370 where a continual reference voltage is inputted.

The pixel electrode 39-1 includes a plurality of first branches 39-1a extended to the x direction which divides each third space X3 in two; a plurality of second branches 39-1b extended to the y direction which divides each fourth space X4 in two; a third branch 39-1c crossed to one portion of the first branches 39-1a and overlapping the third dividing electrode 37-1c of the counter electrode 37-1; a fourth branch 39-1d connecting one portion of the second branches 39-1b, overlapping the bar electrode 37-1b of the counter electrode 37-1 and crossing the third branch 39-1c; a fifth branch 39-1e connecting the other portion of the second branches 39-1b and in contact with the TFT 35.

As described above, the branches 39-1*a*, 39-1*b*, 39-1*c*, 39-1*d* and 39-1*e* consisting the pixel electrode 39-1 preferably parallel to the data bus line 33 are disposed at the central portions of sub pixel PIX and less influence of the data bus line 32 exists so that the crosstalk decreases.

Modification 1

Figure 12B:
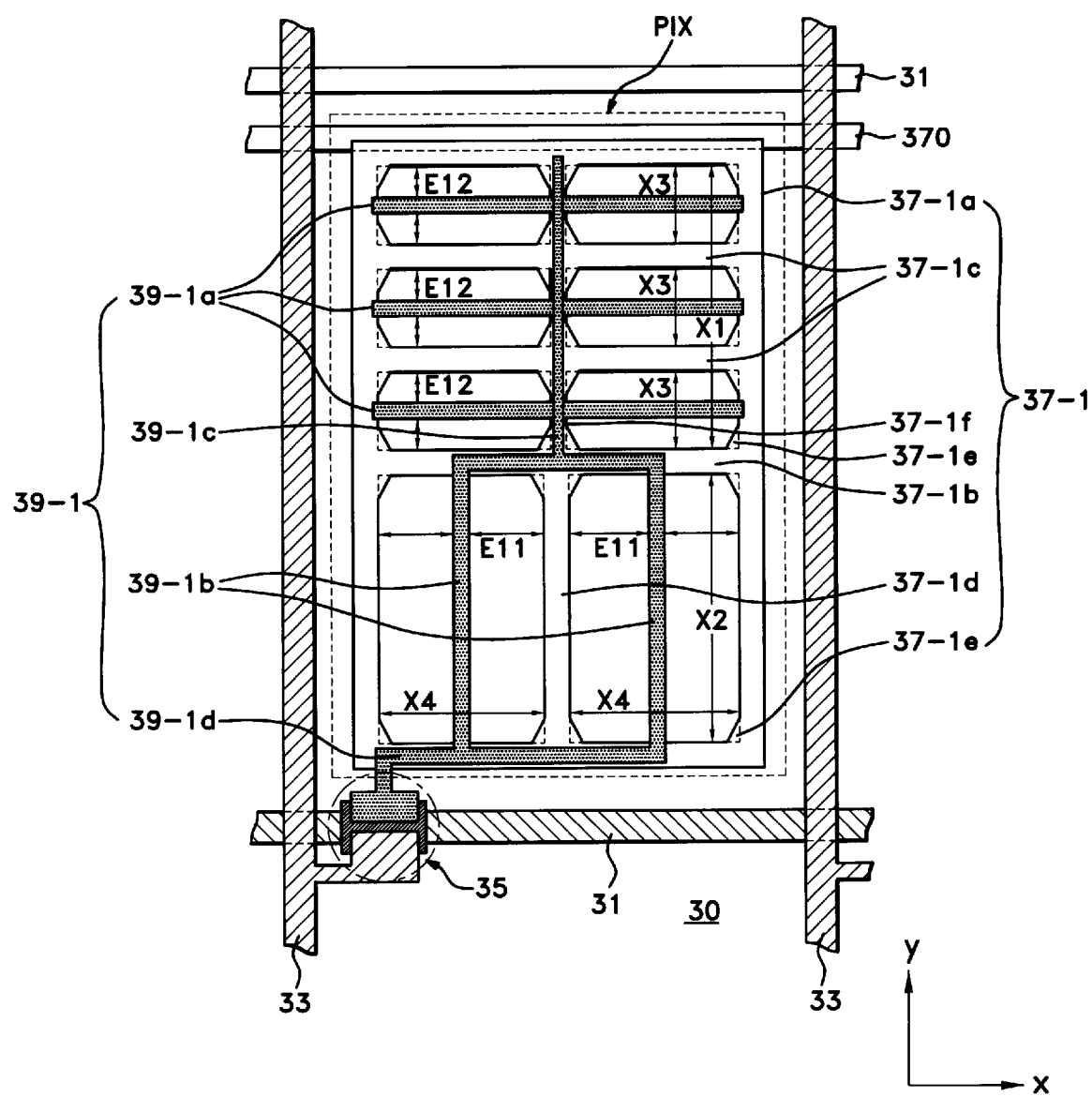

In this modification, the LCD of the fifth embodiment having the structure preventing edge electric field generation is provided. A gate bus line, a data bus line, a TFT, a common electrode wirings and a pixel electrode have the same structure with that of FIG. 12A except some portions in the counter electrode structure. Referring to FIG. 12B, the counter electrode 37-1 includes a main electrode 37-1*a* of rectangular frame type and a bar electrode 37-1*b* extended to the x direction which divides an region surrounded by the main electrode 37-1*a*. The region surrounded by the main electrode 37-1*a* is divided into a first space X1 and a second space X2. The counter electrode 37-1 further includes a plurality of first dividing electrodes 37-1*c* extended to the x direction which divides the first space X1 into a plurality of spaces and a plurality of second dividing electrodes 37-1*d* extended to the y direction which divides the second space X2 in a plurality of spaces. The first dividing electrodes 37-1*c* divide the first space X1 into a plurality of third spaces X3 and the second dividing electrodes 37-1*d* divide the second space X2 into a plurality of fourth spaces X4. In this embodiment, a third dividing electrode 37-1*f* extended to the y direction which divides each third space X3 in two is also included in the counter electrode 37-1. Consequently the third dividing electrode 37-1*f* is perpendicular to the first dividing electrodes 37-1*c*. Furthermore, a rib 37-1*e* which makes the corners have obtuse angles are included so as to prevent the edge electric field. Here, the rib 37-*e* is a right-angled triangle or another right-angled triangle whose hypotenuse is rounded. As described above, the pixel electrode 39-1 is disposed at the central region of sub pixel PIX and then the ribs 37-1*e* are formed at the respective corners of the counter electrode. Therefore the crosstalk raised between the data bus line 31 and the pixel electrode 39-1 and the edge electric field formed at the corners consisted of the counter electrode 37-1 and the pixel is electrode 39-1.

According to the present invention as described above, by applying voltages to the counter electrode and the pixel electrode, an electric field of the x direction which is parallel to the gate bus line and an electric field of the y direction which is parallel to the data bus line are formed simultaneously thereby forming a dual domain or a multi-domain. Both long and short axes are shown simultaneously in every azimuth angles and the color shift is prevented by compensating the refraction anisotropy of the LC molecules.

Further, the parasitic electric field is prevented by forming ribs at the corner of the counter electrode. The picture quality of the LCD is more enhanced.

The spirit of the present invention is also applicable to all kinds of LCDs in which a counter electrode and a pixel electrode are formed in the same plane.

The structure of counter electrode and pixel electrode of the present invention is also changeable under the conditions that the LCD has the x direction electric field and the y direction electric field simultaneously.

Various changes and modifications can be made without departing from the spirit and the scope of the invention as defined by the following claims.

We claim:

1. A liquid crystal display comprising:
   a substrate;
      a counter electrode formed on the substrate and including a rectangular frame type main electrode and at least one dividing electrode to divide a space surrounded by the main electrode into a plurality of spaces;
      a pixel electrode formed on the substrate and including a first electrode traversing some portions of the counter electrode spaces with a first direction and a second electrode which is electrically connected to the first electrode and traversing the rest of the counter electrode spaces with a second direction perpendicular to the first direction; and
      an insulating layer which insulates the counter electrode and the pixel electrode from each other.

2. The liquid crystal display of claim 1, wherein the plurality of spaces divided by the dividing electrode of the counter electrode are at least two spaces.

3. The liquid crystal display of claim 2, wherein the plurality of spaces divided by the dividing electrode of the counter electrode are two spaces.

4. The liquid crystal display of claim 3, wherein the intensity ratio of the first electric field formed between the first electrode of the pixel electrode and the counter electrode, to the second electric field formed between the second electrode and the counter electrode is in the range of 0.6~1.4.

5. The liquid crystal display of claim 2, wherein the plurality of spaces divided by the dividing electrode of the counter electrode are three spaces, and the first electrodes of the pixel electrode are arranged in the two of three spaces respectively and the second electrode of the pixel electrode is arranged in the remained one space.

6. The liquid crystal display of claim 3, wherein the intensity ratio of the first electric field formed between the first electrode of the pixel electrode and the counter electrode, to the second electric field formed between the second electrode and the counter electrode is in the range of 0.2~0.8.

7. The liquid crystal display of claim 2, wherein the plurality of spaces divided by the dividing electrode of the counter electrode are four spaces, the first electrodes of the pixel electrode are arranged in the two of the four spaces respectively and the second electrodes of the pixel electrode are arranged in the remained two spaces.

8. The liquid crystal display of claim 7, wherein the intensity ratio of the first electric field formed between the first electrode of the pixel electrode and the counter electrode, to the second electric field formed between the second electrode and the counter electrode is in the range of 0.6~1.4.

9. The liquid crystal display of claim 2, wherein the plurality of spaces divided by the dividing electrode of the counter electrode are four spaces; long axes of the two of four spaces are parallel to a first direction and long axes of the remained two spaces are parallel to a second direction; and the first electrode of the pixel electrode are arranged in the two spaces to make their long axes to be parallel to the first direction and the second electrodes of the pixel electrode are arranged in the remained two spaces to make their long axes to be parallel to the second direction.

10. The liquid crystal display of claim 9, wherein the intensity ratio of the first electric field formed between the first electrode of the pixel electrode and the counter electrode, to the second electric field formed between the second electrode and the counter electrode is in the range of 0.6~1.4.

11. The liquid crystal display of claim 2, wherein the plurality of spaces divided by the dividing electrode of the counter electrode are five spaces, and the first electrodes of the pixel electrode are arranged in the two of five spaces respectively and the second electrodes of the pixel electrode is formed in the remained three spaces respectively.

12. The liquid crystal display of claim 11, wherein the intensity ratio of the first electric field formed between the first electrode of the pixel electrode and the counter electrode, to the second electric field formed between the second electrode and the counter electrode is in the range of 1.2~1.8.

13. A liquid crystal display comprising:

a liquid crystal layer having a plurality of liquid crystal molecules;

a lower substrate disposed at one side of the liquid crystal layer and having a sub pixel defined by crossing a gate bus line and a data bus line at an interface with said liquid crystal layer, a thin film transistor at each intersection of the gate bus line and the data bus line and a counter and a pixel electrodes for driving the liquid crystal molecules within each sub pixel;

an upper substrate disposed at the other side of the liquid crystal layer and having a color filter;

a first and a second homogeneous alignment layers having rubbing axis of a predetermined direction and interposed between the liquid crystal layer and the lower substrate, and between the liquid crystal layer and the upper substrate; and a first and a second polarizing plates disposed at the outer surfaces of the lower substrate and the upper substrate respectively;

wherein the counter electrode includes a rectangular frame type main electrode and a dividing electrode to divide a space surrounded by the rectangular frame type main electrode into a plurality of spaces;

wherein the pixel electrode includes a first electrode traversing some spaces of the counter electrode spaces with a direction parallel to the gate bus line and a second electrode which is electrically connected to the first electrode and traversing the rest of the counter electrode spaces with a direction parallel to the data bus line; and wherein an electric field parallel to the surface of the substrate and the gate bus line and an electric field parallel to the surface of the substrate and the data bus line are simultaneously formed when a voltage is applied to the counter electrode and the pixel electrode.

14. The liquid crystal display of claim 13, wherein the angles of the rubbing axis of the first homogeneous alignment layer and the gate bus line are 35 and 55 degrees, the rubbing axis of the second homogeneous alignment layer is anti-parallel to the rubbing axis of the first homogeneous alignment layer, the polarizing axis of the first polarizing plate is parallel to the rubbing axis of the first homogeneous alignment layer, and the polarizing axis of the second polarizing plate is perpendicular to the polarizing axis of the first polarizing plate.

15. The liquid crystal display of claim 14, wherein the plurality of spaces divided by the dividing electrode of the counter electrode are at least two spaces.

16. The liquid crystal display of claim 14, wherein the dividing electrode comprises:

a bar electrode extended parallel to the gate bus line so as to divide the space surrounded by the main electrode in a first space and a second space;

at least one first dividing electrode extended parallel to the gate bus line so as to divide the first space into a plurality of the third spaces; and at least one second dividing electrode extended parallel to the data bus line so as to divide the second space into a plurality of the fourth spaces, wherein the first electrode of pixel electrode extends parallel to the gate bus line so as to divide the third space respectively and the second electrodes of pixel electrode extends parallel to the data bus line so as to divide the fourth space respectively.

17. The liquid crystal display of claim 16, wherein the total intensity ratio of the electric field parallel to the gate bus line within sub pixel, to the electric field parallel to the data bus line is in the range of 0.6~1.4.

18. The liquid crystal display of claim 16, wherein the pixel electrode further comprises the connecting mean for connecting between the first electrodes and the second electrodes, the connecting mean is disposed to overlap with a selected portion of the counter electrode.

19. The liquid crystal display of claim 16, wherein the liquid crystal molecules in the liquid crystal layer is of positive dielectric anisotropy and the widths of the counter electrode and the pixel electrode are shorter than the distance of the counter electrode and the pixel electrode.

20. The liquid crystal display of claim 16, wherein the liquid crystal molecules in the liquid crystal layer is of negative dielectric anisotropy and the widths of the counter electrode and the pixel electrode are larger than the distance of the counter electrode and the pixel electrode, and the counter electrode and the pixel electrode are made of transparent metal.

21. The liquid crystal display of claim 16, wherein the counter electrode further comprises ribs of right-angled triangle inserted in each corner of the counter electrode.

22. The liquid crystal display of claim 21, wherein the hypotenuses of the ribs are rounded.

23. The liquid crystal display of claim 13, wherein the product of the thickness of the liquid crystal layer and the refraction anisotropy of the liquid crystal molecules is in the range of 0.2 $\mu$m~0.6 $\mu$m.

24. A liquid crystal display comprising:

a liquid crystal display layer having a plurality of liquid crystal molecules;

a lower substrate disposed at one side of the liquid crystal layer and having a sub pixel defined by crossing a gate bus line and a data bus line at an interface with said liquid crystal layer and having a thin film transistor at each intersection of the gate bus line and the data bus line, and a counter and a pixel electrodes for driving the liquid crystal molecules within each sub pixel;

an upper substrate disposed at the other side of the liquid crystal layer and having a color filter;

a first and a second homeotropic alignment layers interposed between the liquid crystal layer and the lower substrate, and between the liquid crystal layer and the upper substrate;

a first and a second polarizing plates disposed in the outer surfaces of the lower substrate and the upper substrate respectively; and a phase compensating plate sandwiched between the upper substrate and the second polarizing plate;

wherein the counter electrode includes a rectangular frame type main electrode and a dividing electrode to divide a space surrounded by the rectangular frame type main electrode into a plurality of spaces;

wherein the pixel electrode includes a first electrode traversing some spaces of the counter electrode spaces with a direction parallel to the gate bus line and a second electrode which is electrically connected to the first electrode and traversing the rest of the counter electrode spaces with a direction parallel to the data bus line; and wherein an electric field parallel to the surface of the substrate and the gate bus line and an electric field parallel to the data bus line are simultaneously formed when a voltage is applied to the counter electrode and the pixel electrode.

25. The liquid crystal display of claim 24, wherein the angle of the polarizing axis of the first polarizing plate and the gate bus line is approximately 45 degrees, and the second polarizing axis of the second polarizing plate is perpendicular to the first polarizing axis of the first polarizing plate.

26. The liquid crystal display of claim 25, wherein the plurality of spaces divided by the dividing electrode of the counter electrode are at least two spaces.

27. The liquid crystal display of claim 26, wherein the dividing electrode comprises:

a bar electrode extended parallel to the gate bus line so as to divide the space surrounded by the main electrode in a first space and a second space;

at least one first dividing electrode extended parallel to the gate bus line so as to divide the first space into a plurality of the third space;

at least one second dividing electrode extended parallel to the data bus line so as to divide the second space into a plurality of the fourth space, wherein the first electrode of the pixel electrode extends parallel to the gate bus line so as to divide the third space respectively and the second electrodes of pixel electrode extends parallel to the data bus line so as to divide the fourth space respectively.

28. The liquid crystal display of claim 27, wherein the total intensity ratio of the electric field parallel to the gate bus line within sub pixel, to the electric field parallel to the data bus line is in the range of 0.6~1.4.

29. The liquid crystal display of claim 27, wherein the pixel electrode further comprises the connecting mean for connecting between the first electrodes and the second electrodes, the connect mean is disposed to overlap with a selected portion of the counter electrode.

30. The liquid crystal display of claim 27, wherein the liquid crystal molecules in the liquid crystal layer is of positive dielectric anisotropy and the widths of the counter electrode and the pixel electrode are shorter than the distance of the counter electrode and the pixel electrode.

31. The liquid crystal display of claim 27, wherein the liquid crystal molecules in the liquid crystal layer is of negative dielectric anisotropy and the widths of the counter electrode and the pixel electrode are larger than the distance of the counter electrode and the pixel electrode, and the counter electrode and the pixel electrode are made of transparent metal.

32. The liquid crystal display of claim 27, wherein the counter electrode further comprises ribs of right-angled triangle inserted in each corner of the counter electrode.

33. The liquid crystal display of claim 32, wherein the hypotenuse of the ribs are rounded.

34. The liquid crystal display of claim 24, wherein the phase compensating plate is composed of the liquid crystal molecules of negative refraction anisotropy.

35. The liquid crystal display of claim 34, wherein the product of the thicknesses of the phase compensating plate and the index of refraction anisotropy of the liquid crystal molecules, is the same with the product of the thicknesses of the liquid crystal layer and the index of the refraction anisotropy of the liquid crystal molecules.

36. The liquid crystal display of claim 35, wherein the product of the thickness of the liquid crystal layer and the refraction anisotropy of the liquid crystal molecules is in the range of 0.2 $\mu$m~0.6 $\mu$m.

37. A liquid crystal display comprising:

a liquid crystal display layer having a plurality of liquid crystal molecules;

a lower substrate disposed at one side of the liquid crystal layer and having a sub pixel defined by crossing a gate bus line and a data bus line at an interface with said liquid crystal layer and having a thin film transistor at each intersection of the gate bus line and the data bus line, and a counter and a pixel electrodes for driving the liquid crystal molecules within each sub pixel;

an upper substrate disposed at the other side of the liquid crystal layer and having a color filter;

a first and a second alignment layers having predetermined direction of rubbing axes and interposed between the liquid crystal layer and the lower substrate, and between the liquid crystal layer and the upper substrate; and a first and a second polarizing plates disposed at the outer surfaces of the lower substrate and the upper substrate respectively, wherein the counter electrode includes a rectangular frame type main electrode and a dividing electrode to divide a space surrounded by the rectangular frame type main electrode into a plurality of spaces;

wherein the pixel electrode includes a first branch traversing some spaces of the counter electrode spaces with a direction parallel to the gate bus line, a second branch which is electrically connected to the first branch and traversing the rest of the counter electrode spaces with a direction parallel to the data bus line, a third branch which is electrically connected to the first electrode and crossed to one portion of the first branch, said third branch of the pixel electrode parallel to the data bus line is disposed in the center portion of sub pixel; and wherein an electric field parallel to the surface of the substrate and the gate bus line and an electric field parallel to the data bus line are simultaneously formed when a voltage is applied to the counter electrode and the pixel electrode.

38. The liquid crystal display of claim 37, wherein the dividing electrode comprises:

a bar electrode extended parallel to the gate bus line so as to divide the space surrounded by the main electrode in a first space and a second space;

at least one first dividing electrode extended parallel to the gate bus line so as to divide the first space into a plurality of the third spaces;

at least one second dividing electrode extended parallel to the data bus line so as to divide the second space into a plurality of the fourth spaces; and a third dividing electrode extended parallel to the data bus line so as divide the third space in two, wherein the first branches of the pixel electrode extend parallel to the gate bus line so as to divide the third space respectively;

the second branches of the pixel electrode extend parallel to the data bus line so as to divide the fourth space respectively; and the third branch of the pixel electrode overlaps the third dividing electrode of the counter electrode.

39. The liquid crystal display of claim 38, wherein the intensity ratio of the total intensity of the electric field parallel to the gate bus line within sub pixel, to the electric field parallel to the data bus line is in the range of 0.6~1.4.

40. The liquid crystal display of claim 38, wherein the liquid crystal molecules in the liquid crystal layer is of positive dielectric anisotropy and the widths of the counter electrode and the pixel electrode are shorter than the distance of the counter electrode and the pixel electrode.

41. The liquid crystal display of claim 38, wherein the liquid crystal molecules in the liquid crystal layer is of negative dielectric anisotropy and the widths of the counter electrode and the pixel electrode are lager than the distance of the counter electrode and the pixel electrode, and the counter electrode and the pixel electrode are made of a transparent metal.

42. The liquid crystal display of claim 38, wherein the alignment layer is a homogeneous alignment layer having a rubbing axis of predetermined direction.

43. The liquid crystal display of claim 38, wherein the alignment layer is a homeotropic alignment layer.

44. The liquid crystal display of claim 38, wherein a phase compensating plate is further sandwiched between the upper substrate and the second polarizing plate.

45. The liquid crystal display of claim 44, wherein the phase compensating plate is composed of the liquid crystal molecules of negative refraction anisotropy.

46. The liquid crystal display of claim 45, wherein the product of the thicknesses of the phase compensating plate and the index of refraction anisotropy of the liquid crystal molecules, is the same with the product of the thicknesses of the liquid crystal layer and the index of the refraction anisotropy of the liquid crystal molecules.

47. The liquid crystal display of claim 46, wherein the product of the thickness of the liquid crystal layer and the refraction anisotropy of the liquid crystal molecules is in the range of 0.2 $\mu$m~0.6 $\mu$m.

48. The liquid crystal display of claim 38, wherein the counter electrode further comprises ribs of right-angled triangle inserted in each corner of the counter electrode.

49. The liquid crystal display of claim 38, wherein the hypotenuses of the ribs are rounded.

* * * * *